United States Patent
Thekkath et al.

(10) Patent No.: US 7,724,261 B2
(45) Date of Patent: May 25, 2010

(54) PROCESSOR HAVING A COMPARE EXTENSION OF AN INSTRUCTION SET ARCHITECTURE

(75) Inventors: Radhika Thekkath, Palo Alto, CA (US); G. Michael Uhler, Redwood City, CA (US); Ying-wai Ho, Los Altos, CA (US); Chandlee B. Harrell, Cupertino, CA (US)

(73) Assignee: MIPS Technologies, Inc., Sunnyvale, CA (US)

(*) Notice: Subject to any disclaimer, the term of this patent is extended or adjusted under 35 U.S.C. 154(b) by 0 days.

(21) Appl. No.: 11/806,845

(22) Filed: Jun. 4, 2007

(65) Prior Publication Data

US 2008/0022077 A1 Jan. 24, 2008

Related U.S. Application Data

(63) Continuation of application No. 09/364,786, filed on Jul. 30, 1999, now Pat. No. 7,242,414.

(51) Int. Cl.
G06T 1/20 (2006.01)
(52) U.S. Cl. .................. 345/522; 345/623
(58) Field of Classification Search ........... 345/522, 345/623
See application file for complete search history.

(56) References Cited

U.S. PATENT DOCUMENTS 3,889,107 A * 6/1975 Sutherland .......... 345/623

| 4,511,990 | A | | 4/1985 | Hagiwara et al. |
| 4,839,846 | A | | 6/1989 | Hirose et al. |
| 4,866,652 | A | | 9/1989 | Chu et al. |
| 4,879,676 | A | | 11/1989 | Hansen |
| 4,967,375 | A | | 10/1990 | Pelham et al. |
| 4,999,789 | A | | 3/1991 | Fiasconaro |
| 5,012,433 | A | * | 4/1991 | Callahan et al. ............. 345/623 |
| 5,025,407 | A | | 6/1991 | Gulley et al. |
| 5,038,313 | A | | 8/1991 | Kojima |

(Continued)

FOREIGN PATENT DOCUMENTS

EP 0 747 861 A2 12/1996

(Continued)

OTHER PUBLICATIONS

A 22-bit floating point registered arithmetic logic unit Eldon, J.;Acoustics, Speech, and Signal Processing, IEEE International Conference on ICASSP '83. vol. 8, Apr. 1983 pp. 943-946.*

(Continued)

*Primary Examiner*—Javid A Amini
(74) *Attorney, Agent, or Firm*—Sterne, Kessler, Goldstein & Fox PLLC

(57) ABSTRACT

A processor having a compare extension of an instruction set architecture which incorporates a set of high performance floating point operations. The instruction set architecture incorporates a variety of data formats including single precision and double precision data formats, as well as the paired-single data format that allows two simultaneous operations on a pair of operands. The extension includes instructions directed to a magnitude compare of floating point numbers and conversions between a pair of 32-bit fixed point integers and paired-single floating point format.

12 Claims, 23 Drawing Sheets

U.S. PATENT DOCUMENTS

| | | | |
|---|---|---|---|
| 5,159,665 A | 10/1992 | Priem et al. | |
| 5,185,713 A | 2/1993 | Kobunaya | |
| 5,206,823 A | 4/1993 | Hesson | |
| 5,220,524 A | 6/1993 | Hesson | |
| 5,257,216 A | 10/1993 | Sweedler | |
| 5,278,949 A | 1/1994 | Thayer | |
| 5,341,321 A | 8/1994 | Karp et al. | |
| 5,357,599 A | 10/1994 | Luken | |
| 5,359,548 A | 10/1994 | Yoshizawa et al. | |
| 5,367,650 A | 11/1994 | Sharangpani et al. | |
| 5,392,228 A | 2/1995 | Burgess et al. | |
| 5,420,966 A | 5/1995 | Silverbrook | |
| 5,420,971 A | 5/1995 | Westerink et al. | |
| 5,428,716 A | 6/1995 | Brokenshire et al. | |
| 5,444,838 A | 8/1995 | Kommrusch et al. | |
| 5,511,016 A | 4/1996 | Bechade | |
| 5,517,438 A | 5/1996 | Dao-Trong et al. | |
| 5,530,663 A | 6/1996 | Garcia et al. | |
| 5,550,767 A | 8/1996 | Taborn et al. | |
| 5,550,768 A | 8/1996 | Ogilvie et al. | |
| 5,553,015 A | 9/1996 | Elliott et al. | |
| 5,581,796 A * | 12/1996 | Koga et al. | 345/623 |
| 5,602,769 A | 2/1997 | Yu et al. | |
| 5,619,198 A | 4/1997 | Blackham et al. | |
| 5,631,859 A | 5/1997 | Markstein et al. | |
| 5,652,875 A | 7/1997 | Taylor | |
| 5,657,045 A * | 8/1997 | Katsura et al. | 345/685 |
| 5,671,170 A | 9/1997 | Markstein et al. | |
| 5,671,401 A | 9/1997 | Harrell | |
| 5,701,442 A | 12/1997 | Ronen | |
| 5,720,019 A * | 2/1998 | Koss et al. | 345/620 |
| 5,726,927 A | 3/1998 | Wolrich et al. | |
| 5,729,724 A | 3/1998 | Sharangpani et al. | |
| 5,757,321 A | 5/1998 | Billyard | |
| 5,764,555 A | 6/1998 | McPherson et al. | |
| 5,767,859 A | 6/1998 | Rossin et al. | |
| 5,768,170 A | 6/1998 | Smith | |
| 5,774,709 A | 6/1998 | Worrell | |
| 5,777,625 A | 7/1998 | Rossin | |
| 5,790,827 A | 8/1998 | Leung | |
| 5,793,661 A | 8/1998 | Dulong et al. | |
| 5,802,336 A * | 9/1998 | Peleg et al. | 712/200 |
| 5,805,486 A | 9/1998 | Sharangpani | |
| 5,809,294 A | 9/1998 | Ando | |
| 5,815,695 A | 9/1998 | James et al. | |
| 5,847,979 A | 12/1998 | Wong et al. | |
| 5,848,269 A | 12/1998 | Hara | |
| 5,852,443 A | 12/1998 | Kenworthy | |
| 5,852,726 A | 12/1998 | Lin et al. | |
| 5,862,066 A | 1/1999 | Rossin et al. | |
| 5,867,682 A | 2/1999 | Witt et al. | |
| 5,880,983 A | 3/1999 | Elliott et al. | |
| 5,880,984 A | 3/1999 | Burchfiel et al. | |
| 5,889,690 A | 3/1999 | Arakawa | |
| 5,892,698 A | 4/1999 | Naffziger | |
| 5,901,076 A | 5/1999 | Lynch | |
| 5,923,577 A | 7/1999 | Wong et al. | |
| 5,928,316 A | 7/1999 | Wong et al. | |
| 5,933,153 A * | 8/1999 | Deering et al. | 345/501 |
| 5,953,241 A | 9/1999 | Hansen et al. | |
| 5,977,987 A | 11/1999 | Duluk, Jr. | |
| 5,982,380 A | 11/1999 | Inoue et al. | |
| 5,990,904 A | 11/1999 | Griffin | |
| 5,995,122 A | 11/1999 | Hsieh et al. | |
| 5,996,066 A | 11/1999 | Yung | |
| 5,999,960 A | 12/1999 | Gerwig et al. | |
| 6,035,316 A | 3/2000 | Peleg et al. | |
| 6,052,129 A | 4/2000 | Fowler et al. | |
| 6,065,115 A | 5/2000 | Sharangpani et al. | |
| 6,115,729 A | 9/2000 | Matheny et al. | |
| 6,169,554 B1 * | 1/2001 | Deering | 715/764 |
| 6,175,370 B1 | 1/2001 | Kunimatsu | |
| 6,175,851 B1 | 1/2001 | Iourcha et al. | |
| 6,175,907 B1 | 1/2001 | Elliott et al. | |
| 6,199,089 B1 | 3/2001 | Mansingh | |
| 6,249,798 B1 | 6/2001 | Golliver et al. | |
| 6,269,385 B1 | 7/2001 | Han et al. | |
| 6,275,838 B1 | 8/2001 | Blomgren et al. | |
| 6,279,099 B1 * | 8/2001 | Van Hook et al. | 712/23 |
| 6,285,779 B1 | 9/2001 | Lapidous et al. | |
| 6,298,365 B1 | 10/2001 | Dubey et al. | |
| 6,401,108 B1 | 6/2002 | Van Nguyen | |
| 6,414,683 B1 | 7/2002 | Gueziec | |
| 6,426,746 B2 | 7/2002 | Hsieh et al. | |
| 6,510,446 B1 | 1/2003 | Fukagawa | |
| 6,535,898 B1 | 3/2003 | Yuval | |
| 6,570,570 B1 * | 5/2003 | Suzuki et al. | 345/505 |
| 6,581,087 B1 | 6/2003 | Inoue et al. | |
| 6,621,493 B1 * | 9/2003 | Whitten | 345/427 |
| 6,631,392 B1 | 10/2003 | Jiang et al. | |
| 6,697,832 B1 | 2/2004 | Kelley et al. | |
| 6,714,197 B1 | 3/2004 | Thekkath et al. | |
| 6,732,259 B1 | 5/2004 | Thekkath et al. | |
| 6,753,866 B2 * | 6/2004 | Suzuki et al. | 345/505 |
| 6,912,559 B1 | 6/2005 | Ho et al. | |
| 7,117,342 B2 * | 10/2006 | Tremblay et al. | 712/208 |
| 7,242,414 B1 | 7/2007 | Thekkath et al. | |
| 7,301,541 B2 * | 11/2007 | Hansen et al. | 345/522 |
| 2008/0091758 A1 * | 4/2008 | Hansen et al. | 708/501 |
| 2008/0091925 A1 * | 4/2008 | Hansen et al. | 712/222 |

FOREIGN PATENT DOCUMENTS

| | | |
|---|---|---|
| JP | 2001-175880 A | 12/1999 |
| WO | WO 97/05575 A2 | 2/1997 |

OTHER PUBLICATIONS

Advanced Micro Devices, Inc.; 3D NOW! Technology Manual; 1998.

Motorola Inc.; Altivec Technology Programming Environments Manual; May 1998.

Heinrich, Joe, MIPS R4000 Microprocessor Users's Manual, Second Edition, MIPS Technologies, 1994, pp. 154-155, 157, 159, 161, 168, 170-171, B-9, B-10, B-13, B-17, B-19, B-21, B-23, B-27, B-38, B-40 and B-62 (19 pages total). Note: the page count of this document was cited to us as listed here in an International Search Report from MIPS PCT application.

AltiVec™ Technology Programming Environments Manual, Preliminary Rev 0.2, May 1998, pp. 4-16 thru 4-19 (4 pages total).

American National Standards Institute, An American National Standard—IEEE Standard for Binary Floating-Point Arithmetic, (IEEE Std 754-1985), New York, New York, .Copyrgt. 1985, pp. i-vi and 1-14.

3DNOW!™ Technology Manual, Advanced Micro Devices, 1998, pp. i-x and 1-62 (72 pages total).

TMS32010 User's Guide, Texas Instruments, 1983, p. 1183.

International Search Report for PCT Application No. PCT/US00/03900, 6 pages, Mailed Jul. 20, 2000.

Higaki, N. et al., "A 2.5 GFLOPS 6.5 Million Polygons per Second 4-Way VLIW Geometry Processor with SIMD Instructions and Software Bypass Mechanism," 1999 IEEE International Solid-State Circuits Conference, IEEE, 11 pages (publication date unknown, conference dates: Feb. 15-17, 1999).

Hughes, J.K., PL/I Programming, John Wiley & Sons, pp. 5, 15, 16, 74, 75, 188, 189, 327, 411-416, 423, 423, 424, 689 and 690 (1973).

Ito, M. et al., "Efficient Initial Approximation for Multiplicative Division and Square Root by a Multiplication with Operand Modification," IEEE Transactions on Computers, IEEE, vol. 46, No. 4, pp. 495-498 (Apr. 1997).

Kubosawa, H. et al., "A 2.5-GFLOPS, 6.5 Million Polygons per Second, Four-Way VLIW Geometry Processor with SIMD Instructions and Software Bypass Mechanism," IEEE Journal of Solid-State Circuits, IEEE, vol. 34, No. 11, pp. 1619-1626 (Nov. 1999) (appears to correspond to document AR1, Hikagi, N. et al.).

"MIPS Extension for Digital Media with 3D," MIPS Technologies, Inc., pp. 1-26 (Mar. 1997).

"MIPS IV Instruction Set," Revision 3.2, MIPS Technologies, Inc., pp. B-21, B-22, B-26, B-28, B38, B-39, B-40, B-41, B-42, B-47, B-48, B-49, B-55, B-95, B-96 (Sep. 1995).

"MIPS V Instruction Set," Revision 1.0, MIPS Technologies, Inc., pp. B-1-B-37 (1996).

Sweetman, D., See MIPS Run, Morgan Kaufmann Publishers, Inc., ISBN 1-55860-410-3, pp. vii-xiv, 149-173, and 201-242 (1999).

MIPS IV Instruction Set (R10000), Revision 3.2, MIPS Technologies, Inc., entire publication submitted (Sep. 1995).

MIPS RISC Architecture—vol. I—Introduction to the ISA, MIPS Technologies, Inc., entire publication submitted (Aug. 1998).

MIPS RISC Architecture—Vol. II—The Instruction Set, MIPS Technologies, Inc., entire publication submitted (Aug. 1998).

Kubosawa, H. et al., "Four-way VLIW Geometry Processor for 3D Graphics Applications," Fujitsu Sci. Tech. J., 36, 1, pp. 39-47 (Jun. 2000) (manuscript received Dec. 1, 1999).

Thekkath et al., "An Architecture Extension for Efficient Geometry Processing," slides 1-23, presented at Hot Chips 11, A Symposium of High-Performance Chips, Stanford Univ. (Aug. 1999) (submitted for conference review Jul. 14, 1999).

Uhler, M., "Optimizing Game Applications for the MIPS RISC Architecture," Computer Game Developer's Conference, San Jose, CA, 14 pages (Mar. 1999) (submitted for conference review on Feb. 12, 1999).

Uhler, M., "Optimizing Game Applications for the MIPS RISC Architecture," Computer Game Developer's Conference, San Jose, CA, slides 1-22 (Mar. 1999).

AltiVec™ Technology Fact Sheet, Motorola, Inc., 2 pages (1998).

AltiVec™ Technology Programming Environments Manual, Rev. 0.1, Motorola, Inc., entire document submitted (Nov. 1998).

AltiVec™ Technology Programming Interface Manual, Rev. 0, Motorola, Inc., entire document submitted (Jun. 1999).

Fuller, S., "Motorola's AltiVec™ Technology" [white paper], Motorola, Inc., 4 pages (1998).

Diefendorff et al., "AltiVec Extension to PowerPC Accelerates Media Processing," IEEE Micro, pp. 85-95 (Mar./Apr. 2000).

AltiVec™ Technology Programming Environments Manual, Preliminary Rev. 0.2, Motorola, Inc., pp. i-viii, xi-xviii, 1-1 thru 1-11, 4-16 thru 4-33, 6-82, 6-122, 6-135, and 6-143 (May 1998).

Office Action from U.S. Appl. No. 09/249,177, filed Feb. 12, 1999, 10 pages, mailed Jun. 21, 2000.

Rice et al., "Multiprecision division on an 8-bit processor," Computer Arithmetic, 1997, Proceedings, 13$^{th}$ IEEE Symposium on Jul. 6-9, 1997, pp. 74-81.

* cited by examiner

FIG.4

ADDR 601

| 31 | 26 25 | 21 20 | 16 15 | 11 10 | 6 5 | 0 |
|---|---|---|---|---|---|---|
| COP1 010001 | fmt 10110 | ft | fs | fd | ADDR.PS 011000 |
| 6 | 5 | 5 | 5 | 5 | 6 |

FORMAT: ADDR.PS fd, fs, ft

FIG.6A

MULR 602

| 31 | 26 25 | 21 20 | 16 15 | 11 10 | 6 5 | 0 |
|---|---|---|---|---|---|---|
| COP1 010001 | fmt 10110 | ft | fs | fd | MULR.PS 011010 |
| 6 | 5 | 5 | 5 | 5 | 6 |

FORMAT: MULR.PS fd, fs, ft

FIG.6B

RECIP1 603

| 31 | 26 25 | 21 20 | 16 15 | 11 10 | 6 5 | 0 |
|---|---|---|---|---|---|---|
| COP1 010001 | fmt | 0 00000 | fs | fd | RECIP1.fmt 011101 |
| 6 | 5 | 5 | 5 | 5 | 6 |

FORMAT: RECIP1.S fd, fs
RECIP1.D fd, fs
RECIP1.PS fd, fs

FIG.6C

RECIP2 604

| 31 | 26 25 | 21 20 | 16 15 | 11 10 | 6 5 | 0 |
|---|---|---|---|---|---|---|
| COP1 010001 | fmt | ft | fs | fd | RECIP2.fmt 011100 |
| 6 | 5 | 5 | 5 | 5 | 6 |

FORMAT: RECIP2.S fd, fs, ft
RECIP2.D fd, fs, ft
RECIP2.PS fd, fs, ft

FIG.6D

RSQRT1 605

| 31 26 | 25 21 | 20 16 | 15 11 | 10 6 | 5 0 |
|---|---|---|---|---|---|
| COP1 010001 | fmt | 0 00000 | fs | fd | RSQRT1.fmt 011110 |
| 6 | 5 | 5 | 5 | 5 | 6 |

FORMAT: RSQRT1.S fd, fs
RSQRT1.D fd, fs
RSQRT1.PS fd, fs

FIG.6E

RSQRT2 606

| 31 26 | 25 21 | 20 16 | 15 11 | 10 6 | 5 0 |
|---|---|---|---|---|---|
| COP1 010001 | fmt | ft | fs | fd | RSQRT2.fmt 011111 |
| 6 | 5 | 5 | 5 | 5 | 6 |

FORMAT: RSQRT2.S fd, fs, ft
RSQRT2.D fd, fs, ft
RSQRT2.PS fd, fs, ft

FIG.6F

CABS 607

| 31 | 26 | 25 | 21 | 20 | 16 | 15 | 11 | 10  8 | 7 | 6 | 5  4 | 3 | 0 |
|---|---|---|---|---|---|---|---|---|---|---|---|---|---|
| COP1 010001 | | fmt | | ft | | fs | | cc | 0 | 1 | FC 11 | cond | |
| 6 | | 5 | | 5 | | 5 | | 3 | 1 | 1 | 2 | 4 | |

635 points to bits 10-8 (cc); 630 points to bits 3-0 (cond).

FORMAT: CABS.cond.S cc, fs, ft
CABS.cond.D cc, fs, ft
CABS.cond.PS cc, fs, ft

FIG.6G

CVT.PW.PS 608

| 31 | 26 | 25 | 21 | 20 | 16 | 15 | 11 | 10 | 6 | 5 | 0 |
|---|---|---|---|---|---|---|---|---|---|---|---|
| COP1 010001 | | fmt (PS) 10110 | | 0 00000 | | fs | | fd | | CVT.PW.PS 100100 | |
| 6 | | 5 | | 5 | | 5 | | 5 | | 6 | |

FORMAT: CVT.PW.PS fd, fs

FIG.6H

CVT.PS.PW 609

| 31 | 26 25 | 21 20 | 16 15 | 11 10 | 6 5 | 0 |
|---|---|---|---|---|---|---|
| COP1 010001 | fmt (W) 10101 | 0 00000 | fs | fd | CVT.PS.PW 100110 |
| 6 | 5 | 5 | 5 | 5 | 6 |

FORMAT: CVT.PS.PW fd, fs

FIG.61

MADD 801

| 31 | 26 25 | 21 20 | 16 15 | 11 10 | 6 5 | 3 2 | 0 |
|---|---|---|---|---|---|---|---|
| COP1X 010011 | fr | ft | fs | fd | MADD 100 | fmt | |
| 6 | 5 | 5 | 5 | 5 | 3 | 3 | |

FORMAT: MADD.S fd, fr, fs, ft
MADD.D fd, fr, fs, ft
MADD.PS fd, fr, fs, ft

FIG.8

| 31 | 26 25 | 21 20 | 16 15 | 11 10 | 6 5 | 0 |
|---|---|---|---|---|---|---|
| COP1 010001 | fmt | ft | fs | fd | MUL 000010 | |
| 6 | 5 | 5 | 5 | 5 | 6 | |

FORMAT: MUL.S fd, fs, ft
MUL.D fd, fs, ft
MUL.PS fd, fs, ft

FIG.9

CVT.PS.S 1001

| 31 | 26 25 | 21 20 | 16 15 | 11 10 | 6 5 | 0 |
|---|---|---|---|---|---|---|
| COP1 010001 | fmt 10000 | ft | fs | fd | CVT.PS 100110 | |
| 6 | 5 | 5 | 5 | 5 | 6 | |

FORMAT: CVT.PS.S fd, fs, ft

FIG.10

3D MATRIX TRANSFORM $$[x, y, z, w] * \begin{bmatrix} M_0 & M_4 & M_8 & M_{12} \\ M_1 & M_5 & M_9 & M_{13} \\ M_2 & M_6 & M_{10} & M_{14} \\ M_3 & M_7 & M_{11} & M_{15} \end{bmatrix}$$

```
# fp0-fp7 CONTAIN THE 4x4 MATRIX IN PAIR SINGLE FORMAT
#BASE CONTAINS THE ADDRESS OF THE NEXT VECTOR AS TWO PAIR SINGLE VALUES
    ld      fp10, 0(base)          # fp10:  y || x
    ld      fp11, 8(base)          # fp11:  w || z
# fp10 AVAILABLE HERE ASSUMING L1 CACHE HIT. USE PREFETCH TO ACCOMPLISH THIS
    mul.ps  fp14, fp10, fp4        # fp14:  M9y  || M8x
    mul.ps  fp15, fp10, fp6        # fp15:  M13y || M12x
    mul.ps  fp12, fp10, fp0        # fp12:  M1y  || M0x
    mul.ps  fp13, fp10, fp2        # fp13:  M5y  || M4x
# fp14 AVAILABLE HERE
    madd.ps fp14, fp14, fp11, fp5  # fp14:  M11w+M9y  || M10z+M8x
    madd.ps fp15, fp15, fp11, fp7  # fp15:  M15w+M13y || M14z+M12x
    madd.ps fp12, fp12, fp11, fp1  # fp12:  M3w+M1y   || M2z+M0x
    madd.ps fp13, fp13, fp11, fp3  # fp13:  M7w+M5y   || M6z+M4x
    ssnop
# fp14, fp15 AVAILABLE HERE
    addr.ps fp11, fp15, fp14       # fp11:  w' || z'
                                   # fp11:  M15w+M14z+M13y+M12x || M11w+M10z+M9y+M8x
# fp12, fp13 AVAILABLE HERE
    addr.ps fp10, fp13, fp12       # fp10:  y' || x'
                                   # fp10:  M7w+M6z+M5y+M4x || M3w+M2z+M1y+M0x
```

FIG. 12

PROCESSOR HAVING A COMPARE EXTENSION OF AN INSTRUCTION SET ARCHITECTURE

CROSS REFERENCE TO RELATED APPLICATIONS

This application is a continuation of U.S. application Ser. No. 09/364,786, filed Jul. 30, 1999 (now U.S. Pat. No. 7,242,414), which is incorporated by reference herein in its entirety.

The following related applications are hereby incorporated by reference in their entirety for all purposes:

U.S. patent application Ser. No. 09/363,637; inventors Ying-wai Ho, Michael Schulte and John Kelley; and entitled "System and Method for Improving the Accuracy of Reciprocal and Reciprocal Square Root Operations Performed by a Floating-Point Unit;"

U.S. patent application Ser. No. 09/364,514; inventors John Kelley and Ying-wai Ho; and entitled "Floating-Point Processor With Improved Intermediate Result Handling;"

U.S. patent application Ser. No. 09/364,787; inventors Radhika Thekkath, Michael Uhler, Ying-wai Ho, and Chandlee Harrell; and entitled "Processor Having an Arithmetic Extension of an Instruction Set Architecture;"

U.S. patent application Ser. No. 09/364,789; inventors Radhika Thekkath, Michael Uhler, Ying-wai Ho, and Chandlee Harrell; and entitled "Processor Having a Conditional Branch Extension of an Instruction Set Architecture;"

U.S. patent application Ser. No. 09/364,512; inventors Ying-wai Ho, John Kelley and James Jiang; and entitled "Processor With Improved Accuracy For Multiply-Add Operations;" and U.S. patent application Ser. No. 09/363,638; inventors James Jiang, Ying-wai Ho and John Kelley; and entitled "Method and Apparatus for Predicting Floating-Point Exceptions."

FIELD OF THE INVENTION

The present invention pertains to the field of computer processing. More specifically, the present invention pertains to instructions utilized by integrated circuits for processing of data, such as three-dimensional graphics geometry processing.

BACKGROUND OF THE INVENTION

Computer-generated graphics design generally consists of instructions implemented via a graphics program on a computer system. The instructions are recognized by the computer system's processor and so direct the processor to perform the specific calculations and operations needed to produce three-dimensional displays. The set of instructions recognized by the processor constitute the instruction set of that processor.

Computer-generated graphics design can be envisioned as a pipeline through which data pass, where the data are used to define the image to be produced and displayed. At various points along the pipeline, various calculations and operations are specified by the graphics designer, and the data are modified accordingly.

In the initial stages of the pipeline, the desired image is framed using geometric shapes such as lines and polygons, referred to in the art as "primitives" or "graphics primitives." The derivation of the vertices for an image and the manipulation of the vertices to provide animation entail performing numerous geometric calculations in order to project the three-dimensional world being designed to a position in the two-dimensional world of the display screen.

Primitives are then assembled into "fragments," and these fragments are assigned attributes such as color, perspective, and texture. In order to enhance the quality of the image, effects such as lighting, fog, and shading are added, and anti-aliasing and blending functions are used to give the image a smoother and more realistic appearance. In the final stage, the fragments and their associated attributes are combined and stored in the framebuffer as pixels. The pixel values are read from the framebuffer and used to draw images on the computer screen.

The processes pertaining to assigning colors, depth, texturing, lighting, etc., (e.g., creating images) are collectively known as rendering. The specific process of determining pixel values from input geometric primitives is known as rasterization.

The graphics design process is implemented in the prior art utilizing a computer system architecture that includes a geometry engine and a rasterization engine that are coupled in series to form the graphics pipeline through which the data pass. The geometry engine is a processor for executing the initial stages of the graphics design process described above. The rasterization engine is a separate processor for executing the processes above collectively identified as rasterization. Because the geometry engine precedes the rasterization engine in the graphics pipeline, the rate at which the rasterization engine can process data is limited by the rate at which the geometry engine can perform its calculations and forward the results to the rasterization engine. Thus, it is desirable to have a geometry engine capable of performing calculations at speeds that match the speed of the rasterization engine so that the geometry engine does not become a bottleneck in the graphics pipeline.

However, a problem with the prior art is that state-of-the-art rasterization engines are faster than comparable geometry engines, and so the geometry engine has become a limiting component in the graphics pipeline. Consequently, the speed at which the graphics process can be executed is slower than what could be achieved with an improved geometry engine, thus limiting the complexity of scenes which can be rendered.

One prior art solution to the above problem entails designing and implementing complex hardware dedicated to geometry calculations for computer-generated graphics, i.e., dedicated geometry engine hardware such as a dedicated processor. A problem with this prior art solution is that such dedicated hardware can be expensive. Another problem with this solution is that the dedicated hardware can typically only be used on those computer systems specifically designed for that hardware. Moreover, such specialized, dedicated hardware in the form of a dedicated processor typically utilizes an instruction set for which no compilers are available. Hence, all programming must often be done at the assembly or machine-language level. Such low-level languages are machine-dependent and therefore require knowledge of the specific processor. As such, dedicated processors offer somewhat narrow and cumbersome solutions to problems such as improved geometry processing.

Another problem with the dedicated geometry engine hardware is the explicit synchronization mechanisms that need to be implemented in the hardware and the software that use this hardware. Synchronization is needed to communicate the begin and completion points of the computation being done on the dedicated hardware.

Another prior art solution is to perform geometry calculations using the instruction set of a general purpose processor (instead of the dedicated processor discussed above). A general purpose processor, as the term is used herein, has an instruction set partly or wholly supported by a compiler and is therefore programmable to some degree using high-level languages (i.e., machine-independent languages such as C and Pascal). Such languages are easier to program than the low-level languages of the dedicated processor described above. Although portions of a general purpose instruction set may be unsupported by a compiler, advantages are still achieved through the ease with which assembly code may be linked to compiled code during the programming process. Although a general purpose processor is designed for a variety of applications, its actual use can be narrow. Additionally, to the extent a general purpose processor in a given application supports other tasks in addition to geometry calculations, then synchronization between the geometry calculations and these other tasks is implicitly resolved through processor programming.

A problem with this solution, however, is that many instruction sets are not powerful enough to quickly perform the complex calculations required for computer-generated graphics. Thus, the prior art is problematic because it typically takes several instructions to specify and perform an operation or function. In general, the more instructions specified, the longer it takes to perform the operation or function. Thus, geometry calculations are slowed by the number of instructions used in the prior art. It is therefore desirable to reduce the number of instructions, thereby increasing the speed at which a geometry engine can perform geometry calculations.

Accordingly, what is desired is a system and/or method that can increase the speed at which a processor (and, preferably, a general purpose processor) is able to perform geometry calculations for the graphics design process. What is further desired is a system and/or method that can accomplish the above and can also provide a cost-effective solution that can be implemented in computer systems using various types of processors and processor cores. The present invention provides a novel solution to the foregoing.

These and other advantages of the present invention will become obvious to those of ordinary skill in the art after having read the following detailed description of the preferred embodiments which are illustrated in the various drawing Figures.

BRIEF SUMMARY OF THE INVENTION

In accordance with the present invention, a system and method of same are provided that can increase the speed at which a processor is able to perform various operations including geometry calculations for a graphics design process. This system and method can accomplish the above and can also be a cost-effective solution that can be implemented in computer systems using various types of processors and processor cores. This system and method can reduce the number of instructions needed to specify and perform a given operation (e.g., geometry) and thereby facilitate an increase in the speed at which a processor operates.

In accordance with a preferred embodiment of the present invention, an application specific extension to a general purpose instruction set architecture is provided that incorporates high performance floating point operations designed to improve the performance of three-dimensional graphics geometry processing on a general purpose processor. Instructions included in the extension can use a variety of data formats including single precision, double precision and paired-single data formats. The paired-single format provides two simultaneous operations on a pair of operands. The instructions included in the extension may also be used in situations unrelated to three-dimensional graphics processing. Additionally, in an alternative embodiment, these instructions may be defined as part of the instruction set architecture itself rather than an extension to such architecture. These instructions may be carried out in hardware, software, or a combination of hardware and software.

The extension to the instruction set architecture can reduce the number of instructions needed to perform geometry calculations. As a result, a processor may be capable of performing geometry calculations at speeds approaching the speed of the rasterization engine, so that the processor is less likely to become a bottleneck in the graphics pipeline.

In one embodiment, the extension to the instruction set architecture is implemented as a set of floating point instructions that function with a MIPS-based instruction set architecture. In this embodiment, a processor comprising a floating point unit performs geometry calculations by executing the floating point instructions.

In one embodiment, a vertex in a computer graphics image is represented with coordinates. The coordinates are transformed. A floating point magnitude compare instruction is used to perform a magnitude comparison between at least a portion of the transformed coordinates and a value representing a plurality of edges of a specified view volume (e.g., a clip test), such that comparison results for at least three view volumes are obtained. In an aspect of this embodiment, the floating point magnitude compare instruction is a CABS instruction.

In one embodiment, condition code bits are set to one or more specific states to indicate results of the magnitude comparison. A compare condition is specified in the floating point magnitude compare instruction. One of the condition code bits is set to indicate true if an associated compare condition is true and the condition code bit is set to indicate false if the associated compare condition is false.

In one embodiment, a first convert instruction is used for converting a fixed point value into a floating point value. In an aspect of this embodiment, the first convert instruction is a CVT.PS.PW instruction.

In one embodiment, a second convert instruction is used for converting a floating point value into a fixed point value. In an aspect of this embodiment, the second convert instruction is a CVT.PW.PS instruction.

In one embodiment, a general purpose processor and a memory are used to compare a plurality of floating point values. A first instruction is stored in the memory. The first instruction is formatted to operate on a plurality of operands. The first instruction is dispatched to and executed in the general purpose processor. The processor operates on the plurality of operands in parallel to perform a plurality of magnitude compare operations. In one embodiment, each of a plurality of bits is set by the first instruction to a particular state to indicate a result of one of the plurality of magnitude compare operations. In this embodiment, the plurality of bits set by the first instruction indicate whether a primitive will cross at least one edge of a view volume.

In one embodiment, a processor tests at least three view volume edges of a given view volume. A single instruction is dispatched to an execution unit. The single instruction is formatted to operate on a plurality of operands. The plurality of operands are provided to the execution unit. The plurality of operands represent a plurality of normally disposed view volume edges of the given view volume. The single instruction is executed, which causes the execution unit to perform a plurality of magnitude compare operations in parallel on the plurality of operands.

In one embodiment, a computer program product includes a computer-readable medium having a plurality of instructions stored thereon. A first instruction enables a general purpose processor to perform a plurality of magnitude compare operations on a first plurality of operands in parallel, and set a plurality of bits to one or more specific states to indicate results of the plurality of magnitude compare operations.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 4 illustrates an embodiment of a floating point control/status register in accordance with the present invention.

FIGS. 6A, 6B, 6C, 6D, 6E and 6F illustrate an embodiment of each of the arithmetic instructions implemented by the geometry application specific extension of FIG. 3 in accordance with the present invention.

FIGS. 6G, 6H and 6I illustrate an embodiment of each of the compare and format conversion instructions implemented by the geometry application specific extension of FIG. 3 in accordance with the present invention.

FIG. 8 illustrates an embodiment of a multiply/add instruction implemented by the instruction set architecture of FIG. 3 in accordance with the present invention.

FIG. 9 illustrates an embodiment of a multiply instruction implemented by the instruction set architecture of FIG. 3 in accordance with the present invention.

FIG. 10 illustrates a floating point conversion instruction implemented by the instruction set architecture of FIG. 3 in accordance with the present invention.

FIG. 12 provides an annotated listing of instructions used to carry out a representative geometry calculation (the three-dimensional matrix transformation) in accordance with one embodiment of the present invention.

DETAILED DESCRIPTION OF THE INVENTION

Figure 1:
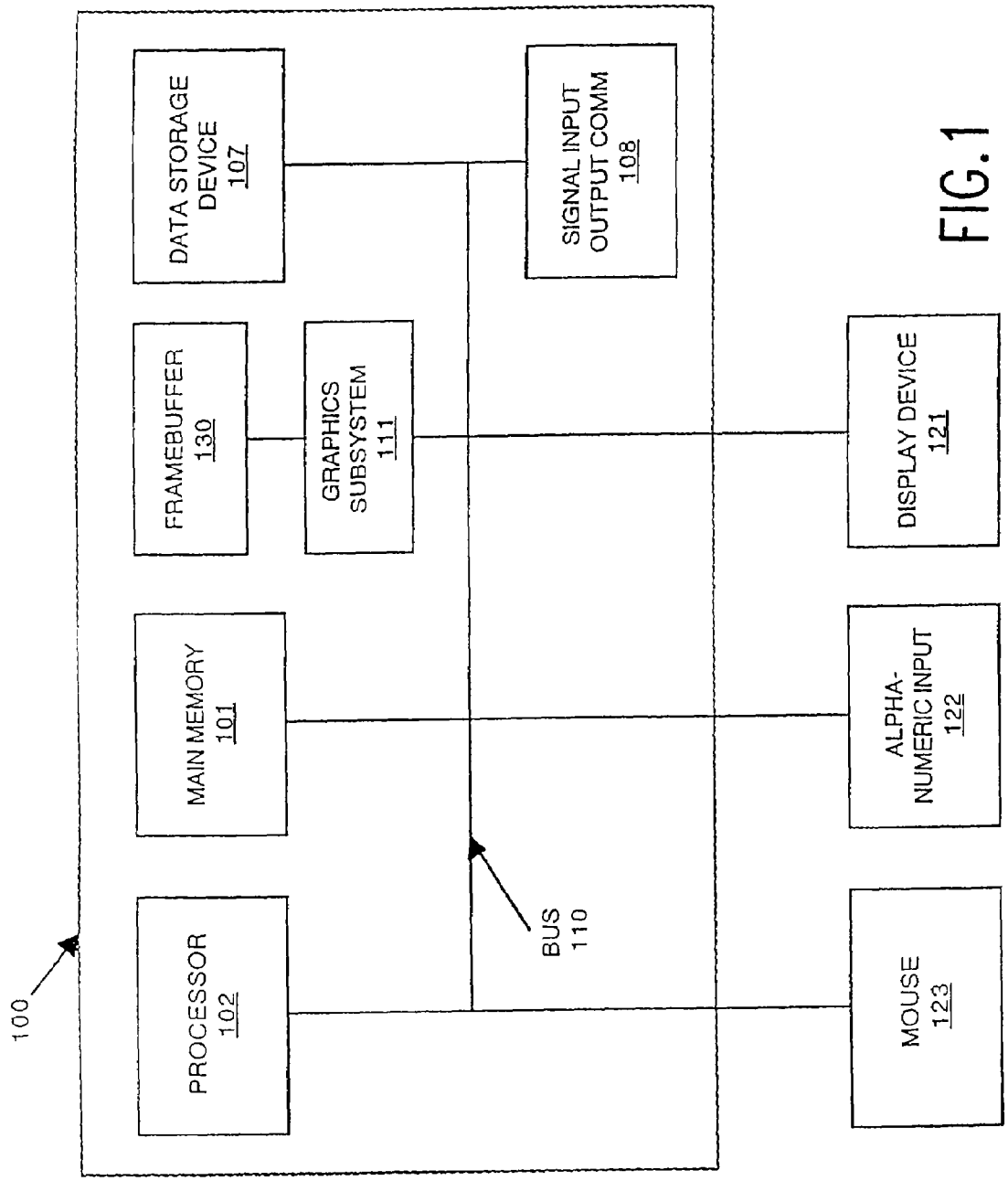
FIG. 1 is a block diagram of an exemplary computer system for performing graphics design and other calculations in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the preferred embodiments of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, fragments, pixels, or the like.

As used herein, a transaction refers to the transmission or receipt of data or other such message information. The transaction may consist of all data associated with a particular computer system operation (e.g., a request or command). A transaction may also consist of a block of data associated with a particular operation; for example, a transfer of data may be broken down into several blocks of data, each block transferred prior to the transfer of a subsequent block, and each block making up a transaction.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "representing," "transforming," "performing," "setting," "executing," or the like, refer to actions and processes of a computer system or similar electronic computing device. The computer system or similar electronic computing device manipulates and transforms data represented as physical (electronic) quantities within the computer system memories, registers or other such information storage, transmission or display devices. The present invention is well suited to the use of other computer systems.

In accordance with a preferred embodiment of the present invention, a geometry application specific extension of a general purpose instruction set architecture is provided that incorporates high performance floating point operations. The instruction set architecture incorporates a variety of data formats including the paired-single data format (that allows two simultaneous operations on a pair of operands), single precision format, and double precision format. In the preferred embodiment, the application specific extension can reduce the number of instructions needed to perform the geometry operations on a general purpose processor. Overall, the extension can reduce the total number of instructions needed in the geometry portion of a graphics pipeline, thereby enabling an acceleration of geometry processing in computer-generated graphics design.

The extension may also be used to reduce the total number of instructions needed in applications other than geometry operations.

Exemplary Computer System Architecture

FIG. 1 is a block diagram of graphics computer system 100 upon which the present embodiment of the present invention can be implemented. Computer system 100 exemplifies a computer-controlled graphics systems for generating complex or three-dimensional images. Computer system 100 comprises a bus or other communication means 110 for communicating information, and a processor 102 coupled with bus 110 for processing information. Bus 110 is a system bus that may include one or more address and data buses. It is appreciated that other configurations of a computer system can be used in accordance with the present invention. It is further appreciated that processor 102 is not tied to any specific memory or input/output technologies.

Computer system 100 further comprises a random access memory (RAM) or other dynamic storage device 101 (main memory 101) coupled to bus 110 for storing information and instructions to be executed by processor 102. Main memory 101 also may be used for storing temporary variables or other intermediate information during execution of instructions by processor 102. Data storage device 107 is coupled to bus 110 and is used for storing information and instructions. Furthermore, signal input/output (I/O) communication device 108 is used to couple computer system 100 onto, for example, a network.

Computer system 100 can also be coupled via bus 110 to an alphanumeric input device 122, including alphanumeric and other keys, which is used for communicating information and command selections to processor 102. Another type of user input device is mouse 123 (or a like device such as a trackball or cursor direction keys) which is used for communicating direction information and command selections to processor 102 and for controlling cursor movement on display device 121. This input device typically has two degrees of freedom in two axes, a first axis (e.g., x) and a second axis (e.g., y), which allows the device to specify positions in a plane.

Continuing with reference to FIG. 1, also coupled to bus 110 is graphics subsystem 111. Processor 102 provides graphics subsystem 111 with graphics data such as drawing commands, coordinate vertex data, and other data related to an object's geometric position, color, and surface parameters. In general, graphics subsystem 111 processes the graphical data, converts the graphical data into a screen coordinate system, generates pixel data (e.g., color, shading, texture) based on the primitives (e.g., points, lines, polygons, and meshes), and performs blending, anti-aliasing, and other functions. In one embodiment of computer system 100, the geometry calculations are performed in processor 102 and, in another embodiment, the geometry calculations are performed in graphics subsystem 111. It is appreciated that the present invention may be practiced on either of these embodiments or in other embodiments of computer system 100 not described. The resulting data are stored in framebuffer 130. A display subsystem (not shown) reads framebuffer 130 and displays the image on display device 121.

Exemplary Processor Architectures

Figure 2A:
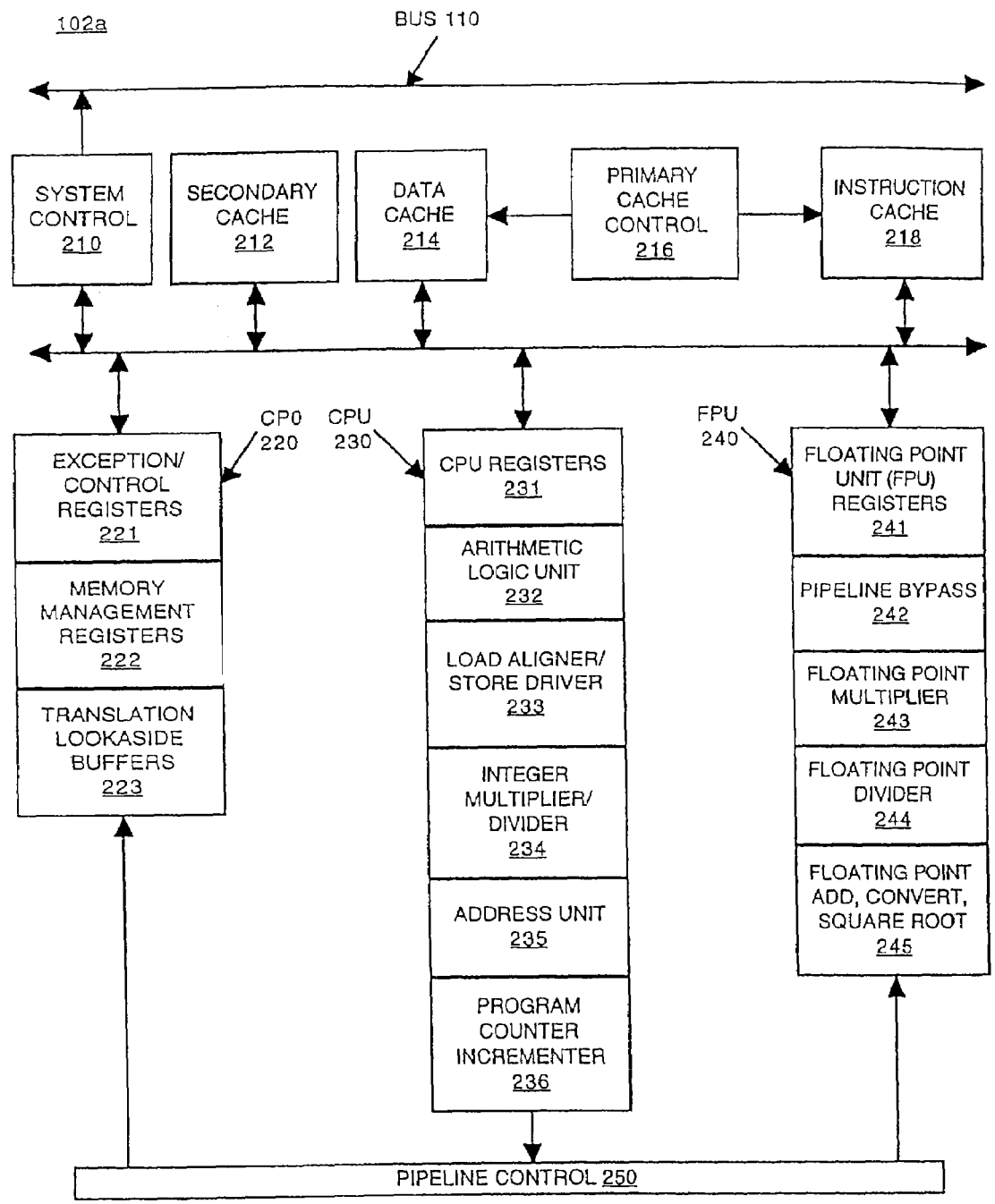
FIGS. 2A and 2B are exemplary general purpose processors of the computer system of FIG. 1 for performing graphics design and other calculations in accordance with embodiments of the present invention.

FIG. 2A is a block diagram of one embodiment of a general purpose processor that can be used by computer system 100 (FIG. 1) to practice the present invention after suitable modifications are made as noted below. A detailed example of processor 102a and its functions is found in "MIPS Microprocessor R4000 User's Manual," Second Edition, 1994, by MIPS Technologies, Inc., of Mountain View, Calif., which is hereby incorporated by reference in its entirety for all purposes. Processor 102a may be made suitable for practicing the present invention with hardware, software, and/or firmware (i.e., microcode) modifications dictated by the extension to the instruction set architecture described below. Such modifications, in light of the following discussion, would be apparent to one of ordinary skill in the art. It is appreciated that other commercially available processor configurations (both MIPS based and non-MIPS based) may be used in accordance with the present invention with hardware, software, and/or firmware (i.e., microcode) modifications.

Processor 102a includes central processing unit (CPU) 230 and coprocessors CP0 220 and FPU 240. CP0 220 is incorporated onto the processor chip and supports the virtual memory system and exception handling. CP0 220 also controls the cache subsystem and also provides diagnostic control and error recovery facilitates. Other embodiments of CP0 220 may perform other functions depending on the specific hardware implementations.

FPU 240 is a floating point coprocessor also incorporated onto the processor chip. FPU 240 extends the CPU 230 instruction set to perform arithmetic operations on floating-point values. FPU 240 includes FPU registers 241 comprising two separate register sets: general registers and control registers.

The general registers, called Floating Point Registers (FPRs), are used to transfer binary data between FPU 240 and the rest of processor 102a. The general registers are also used to hold formatted operand values. In the present embodiment, general registers are each 64 bits wide.

The control registers are used to identify and control FPU 240. The control registers include the floating point control/status register (FCSR) (refer to FIG. 4). In the present embodiment, control registers are each 32 bits wide.

Figure 2B:
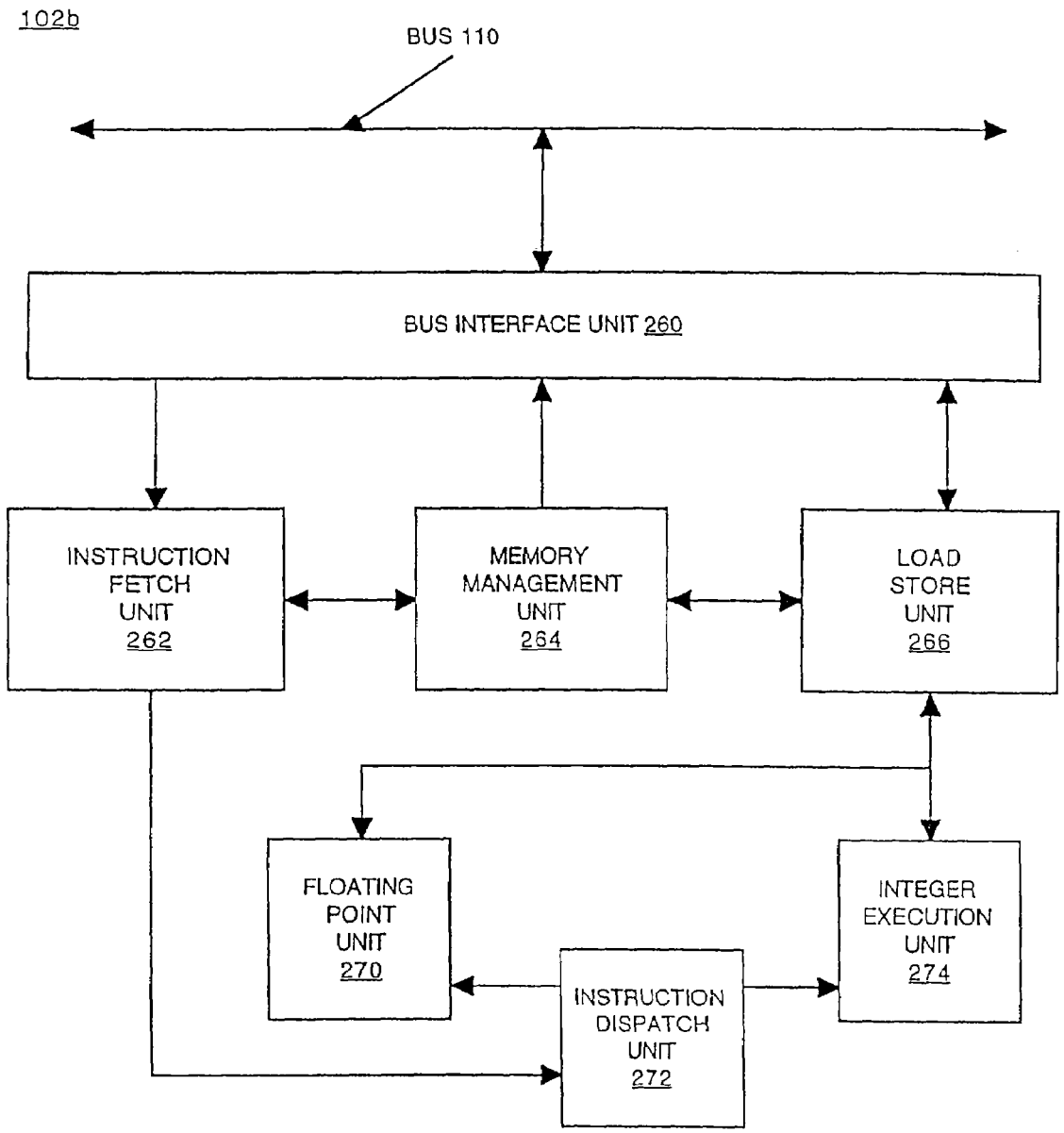

FIG. 2B illustrates another embodiment of a general purpose processor that can be used by computer system 100 (FIG. 1) to practice the present invention. Processor 102b includes bus interface unit 260 for handling transactions between instruction fetch unit 262, memory management unit 264, load store unit 266 and, for example, the memory units of computer system 100 via bus 110.

Memory management unit 264 handles address translation for instruction fetch unit 262 and load store unit 266. For instruction fetch unit 262, in the present embodiment, address translation is required only for instruction cache misses. In the present embodiment, the instruction cache (not shown) is disposed within instruction fetch unit 262. Memory management unit 264 receives an instruction cache miss request from instruction fetch unit 262, completes the address translation, and forwards the miss request to bus interface unit 260. Main memory 101 (FIG. 1) may be used to service this request, providing the necessary instructions over bus 110 to refill the instruction cache via instruction fetch unit 262. For load store unit 266, in the present embodiment, memory management unit 264 completes an address translation for each data cache access.

Load store unit 266 handles all instructions related to memory transactions and data cache management. Load store unit 266 receives load/store instructions from instruction dispatch unit 272, load/store addresses from integer execution unit 274, store data from integer execution unit 274 and floating point unit 270, address translation information from memory management unit 264, and cache refill data from bus interface unit 260. In the present embodiment, load store unit 266 has an internal data cache (not shown) that is physically indexed and physically tagged.

Instruction fetch unit 262 provides an instruction stream to instruction dispatch unit 272. In the present embodiment, instruction fetch unit 262 fetches an address aligned group of four (4) instructions per cycle from an internal instruction cache (not shown) that is virtually addressed and virtually tagged.

Instruction dispatch unit 272 interfaces with two execution units 270 and 274. More specifically, instruction dispatch unit 272 controls two integer execution pipelines (integer execution unit 274) and one floating point execution pipeline (floating point unit 270). Instruction dispatch unit 272 decodes instructions from instruction fetch unit 262, dispatches the decoded instructions to the execution pipelines, and tracks the dispatched instructions. In the present embodiment, instruction dispatch unit 272 receives address aligned groups of up to 4 valid instructions from instruction fetch unit 262, and stages them through a two-entry buffer (not shown), 4 instructions per entry. In the present embodiment, instruction dispatch unit 272 decodes up to two (2) instructions per cycle from the two-entry buffer, and then dispatches the decoded instructions in program order to integer execution unit 274 or floating point unit 270. Instruction dispatch unit 272 keeps track of the dispatched instructions in a pipe queue (not shown) and in an outstanding load queue (not shown). The pipe queue contains an entry for each instruction dispatched to the execution pipelines, and the outstanding load queue contains an entry for load transaction that missed in the data cache in load store unit 266.

In the present embodiment, integer execution unit 274 executes conventional integer instructions such as add/subtract, shift, logic, load/store, branch and integer multiply/divide instructions. Integer execution unit 274 contains two separate execution pipelines and can execute up to two instructions in parallel.

Floating point unit (FPU) 270 executes a geometry application specific extension to an instruction set architecture in accordance with an embodiment of the present invention. In the present embodiment, FPU 270 provides full hardware support for IEEE single and double precision formats, IEEE rounding modes, the paired-single data format (see FIG. 5), and denormalized inputs and outputs. In one embodiment, FPU 270 is optimized for single precision and paired-single formats. In one embodiment, FPU 270 can execute any one of the following floating point instructions per clock cycle: ADDR, MULR, RECIP2, RSQRT2, CVT.PS.PW, CVT.PW.PS, and CABS. In this same embodiment, integer execution unit 284 can execute any one of the branch instructions BC1ANYxx (where xx=2F, 2T, 4F or 4T) per cycle.

In the present embodiment, floating point unit (FPU) 270 is a self-contained coprocessor that interfaces with (and is disposed within) processor 102b. FPU 270 is coupled to instruction dispatch unit 272 for instruction dispatch and completion interface. Instruction dispatch unit 272 tracks the state of each instruction dispatched to FPU 270. FPU 270 reports possible and final exceptions to instruction dispatch unit 272.

Figure 2C:
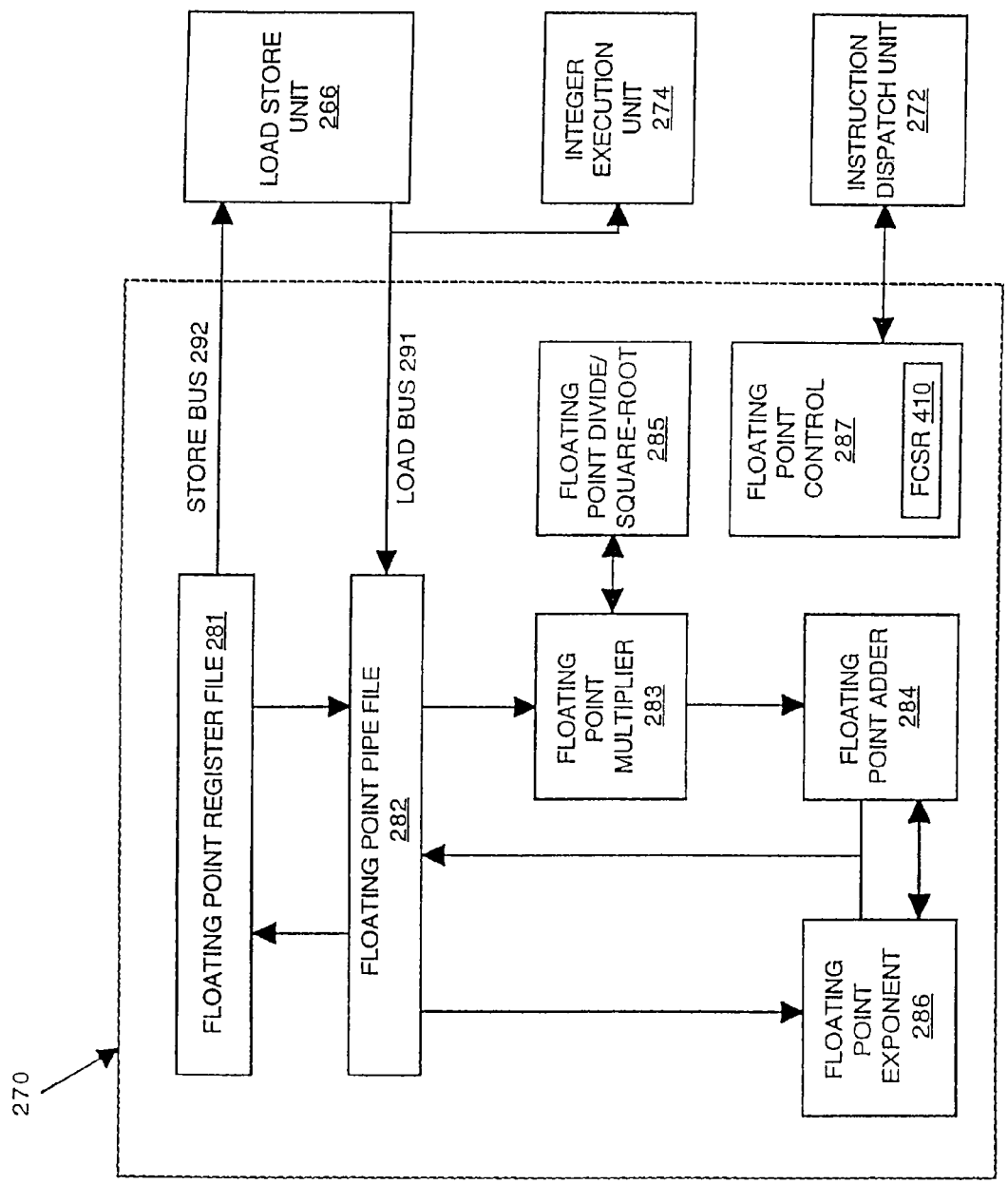
FIG. 2C is a block diagram of one embodiment of a floating point unit of the processor of FIG. 2B in accordance with the present invention.

With reference now to FIG. 2C, FPU 270 contains a general register, Floating Point Register (FPR) file 281, that transfers binary data between FPU 270 and processor 102b. FPU 270 instructions are register-to-register operations, and the instruction operands refer to data in FPR 281. FPU 270 also comprises floating point pipe file (PIP) 282 that stages results until the results are written into FPR 281. The remaining components of FPU 270 are described below.

Table 1 lists instructions that are included in a geometry application specific extension to an instruction set architecture in accordance with an embodiment of the present invention. In an alternative embodiment, some or all of these instructions may be defined as part of an instruction set architecture itself, rather than as an extension. Additional information pertaining to these instructions is provided in conjunction with FIGS. 6A through 6M.

TABLE 1

Exemplary Set of Instructions

| INSTRUCTION NAME (MNEMONIC) | DESCRIPTION (FUNCTION) OF INSTRUCTION |
| --- | --- |
| ADDR | Floating point reduction add |
| MULR | Floating point reduction multiply |
| RECIP1 | Reciprocal first step |
| RECIP2 | Reciprocal second step |
| RSQRT1 | Reciprocal square root first step |
| RSQRT2 | Reciprocal square root second step |
| CVT.PS.PW | Converts fixed point integers to paired-single floating point format |
| CVT.PW.PS | Converts paired-single floating point format to fixed point integers |
| CABS | Magnitude compare of floating point numbers |
| BC1ANY2F | Branch if either one of two consecutive condition codes is false |
| BC1ANY2T | Branch if either one of two consecutive condition codes is true |
| BC1ANY4F | Branch if any one of four consecutive condition codes is false |
| BC1ANY4T | Branch if any one of four consecutive condition codes is true |

With reference to FIG. 2C, the instructions in Table 1 except for branches (i.e., BC1ANYxx) are executed in one or more of floating point multiplier 283, floating point adder 284, floating point divide/square-root 285, floating point exponent 286, and/or floating point pipe file 282. As described below, branch instructions exchange information with floating point unit 270 but are executed in integer unit 274.

The input to floating point adder 284 is driven by the output of floating point multiplier 283; floating point multiplier 283 contains effective paths for bypassing the multiply operation, and so instructions bound for floating point adder 284 are sent to the input of floating point multiplier 283. Similarly, instructions bound for floating point divide/square-root 285 are routed through floating point multiplier 283.

Floating point multiplier 283 is a floating point mantissa multiplier which implements single precision, double precision, and paired-single multiply instructions (e.g., MULR of Table 1), as well as the multiply portion of multiply-add operations. Floating point multiplier 283 accepts two operand inputs from floating point pipe file 282. Its multiply array (580, FIG. 2D) is structured as two single precision multiply datapaths: for single precision operations, only one is used; for paired single operations, both are used independently (in accordance with Single Instruction Stream—Multiple Data Stream [SIMD] architecture operations); and for double precision operations, the two single precision arrays are logically glued together and the array is double-pumped (i.e., the first half of a multiplication is done in the first cycle, and the intermediate results are fed back into the array for another pass) in accordance with conventional techniques. Floating point multiplier 283 produces an exact answer in sum-carry redundant form. This sum and carry are added in a Carry Propagate Adder (CPA 582, FIG. 2D) to get the exact, unrounded result. Rounding information is gathered in a conventional manner and forwarded to floating point adder 284 to obtain the rounded result. Additional information is provided in conjunction with FIG. 6B.

Figure 2D:
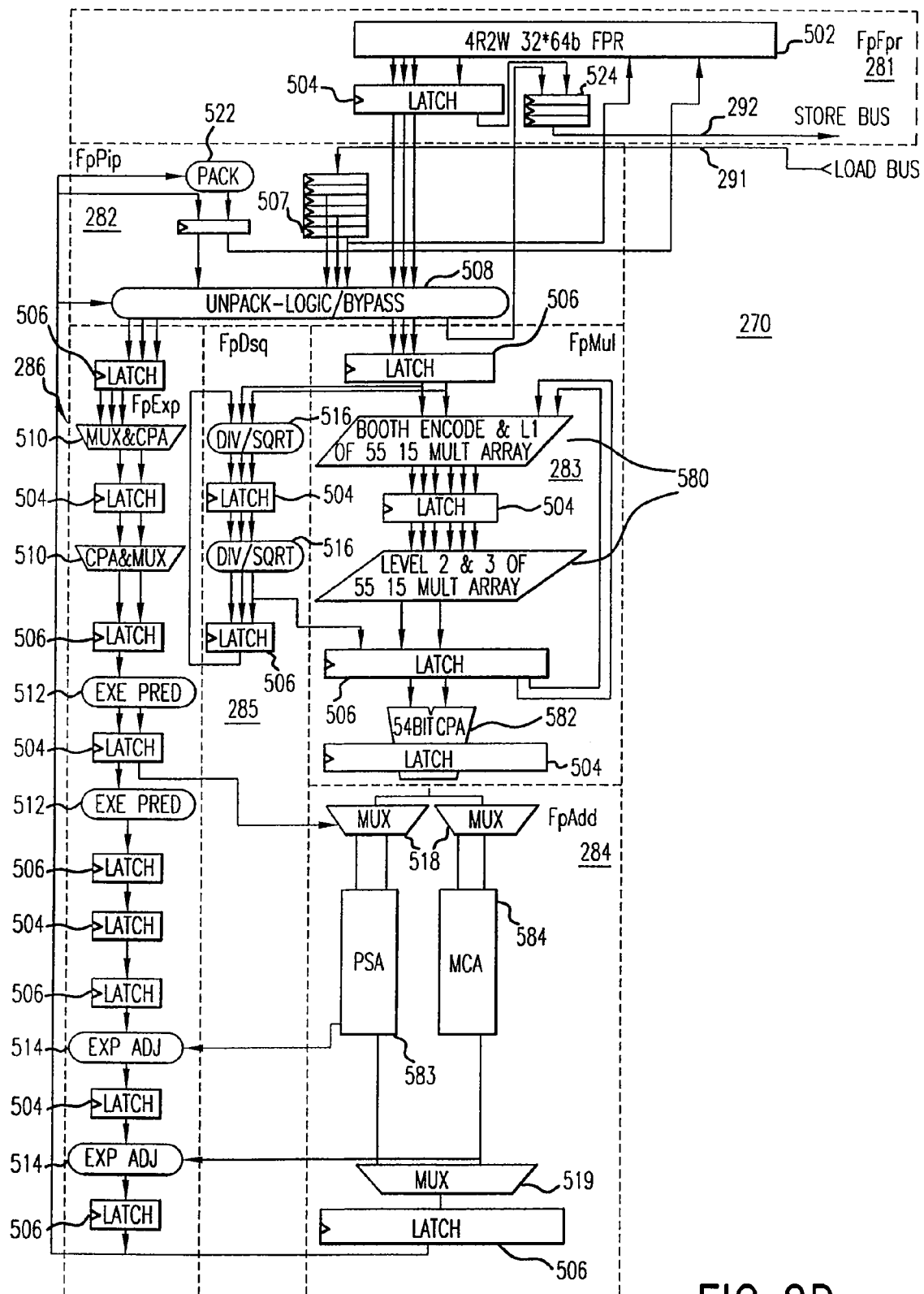
FIG. 2D provides a block diagram illustrating the flow of data through the floating point unit of FIG. 2C in accordance with the present embodiment of the present invention.

Floating point adder 284 is a floating point mantissa adder which implements single precision, double precision, and paired-single floating point add instructions (e.g., ADDR of Table 1) and subtract instructions, as well as the add/subtract portions of compound instructions such as MADD (i.e., floating point multiply add, described below). Floating point adder 284 accepts two operands, an intermediate result from floating point multiplier 283 and a mantissa staged in floating point pipe file 282. To increase performance, a floating-point magnitude addition/subtraction operation is computed by either a prescale adder (PSA) 583 or a massive cancellation adder (MCA) 584 (FIG. 2D). PSA 583 performs all magnitude additions and often performs magnitude subtractions if the difference in operand exponents is greater than two (2), thereby avoiding a large normalization shift after the operation. MCA 584 often performs magnitude subtractions if the difference in operand exponents is less than or equal to two (2), thereby avoiding a large alignment shift before the operation. Thus, the final correct result is selected from either PSA 583 or MCA 584 based upon, among other things, the exponential difference of the operands. The result is then returned to floating point pipe file 282. Selection criteria for PSA 583 and MCA 584 are further described in the above-referenced U.S. patent application Ser. No. 09/364,512.

Because floating point adder 284 needs to handle operands of various precisions, the unit is structured as two parallel single precision datapaths. Only one is used for a single precision operation; two are used independently for paired-single operations (in accordance with SIMD architecture operations); and the two units are logically glued together (in a conventional manner) and both are used for a double precision operation. Additional information is provided in conjunction with FIG. 6A and FIG. 8.

Floating point divide/square-root 285 implements the mantissa portion of divide instructions and square root instructions using a digit-by-digit technique (e.g., a radix-2 SRT or a radix-4 SRT). Floating point exponent 286 determines the exponent of the result of a floating point operation. Floating point exponent 286 determines approximately what the result exponent will be based on the exponents of the operands, and interacts with the mantissa calculation units (e.g., floating point adder 284 and floating point multiplier 283) to determine how to adjust the exponent value based upon normalization shifts and rounding operations. Exponent unit 286 is structured as two independent datapaths; both are used for paired-single instructions with no interaction necessary (like SIMD), and only one is used for double or single precision operations.

Floating point control unit 287 is used to identify and control FPU 270. In the present embodiment, floating point control unit 287 includes the floating point control/status register (FCSR) 410 (refer to FIG. 4). Floating point instructions are sent to floating point control unit 287 by instruction dispatch unit 272. Floating point control unit 287 directs the datapath through the proper sequence of operations, identifies and reports exceptions, computes the resulting sign bit, and handles reads and updates of the FCSR.

Continuing with reference to FIG. 2C, the branch instructions identified in Table 1 above (e.g., BC1ANY2F, BC1ANY2T, BC1ANY4F, and BC1ANY4T) test a floating point condition code held in FCSR 410 (FIG. 4) and do a conditional branch (additional information regarding the branch instructions is provided with regard to FIGS. 6J through 6M). In the present embodiment, instruction dispatch unit 272 (FIG. 2B) dispatches to integer execution unit 274 an operation code (e.g., COP1 together with a specified instruction mnemonic from Table 1; see FIGS. 6J through 6M) to instruct the processor of the specific action to be performed. The operation code is decoded in the branch unit (not shown) in one of the execution pipelines in integer execution unit 274. The branch unit sends to floating point unit 270 the condition code index as well as an indication of the test to be done. Floating point unit 270 tests the condition codes and returns the results of the test to integer execution unit 274. Integer execution unit 274 sends a branch taken/not taken indication to instruction fetch unit 262 (FIG. 2B), which will fetch the appropriate instructions in accordance with the branch indication.

FIG. 2D provides a block diagram illustrating the flow of data through FPU 270 in accordance with the present embodiment of the present invention. Contained within this data flow are latches 504 (triggered by a first phase of a system clock) and latches 506 (triggered by a second phase of the clock). The remaining top-level components identified within each block of FIG. 2D represent conventional elements of FPU design well known to those having ordinary skill in the art.

Referring to FIG. 2D, data start from floating point register file 281 passing from register 502 (32-entry, 64-bit register file with 4 read ports and 2 write ports) to unpack/bypass logic 508 in pipe file 282. (Data may also flow directly into logic 508 from load bus 291 and register file 507.) This logic unpacks an operand into an "internal format," discussed in previously-identified copending application Ser. Nos. 09/363,638 and 09/363,637. This logic may also perform bypass operations for operands that do not require any arithmetic operation (i.e., circulate operands back to file 281). Where arithmetic operation is required, data then flow to multiplier 283 and exponent 286.

In exponent 286, exponents are arithmetically combined in Multiplexer & CPA circuits 510, exception prediction operations (e.g., underflow, overflow) are carried out in exception prediction logic 512, and exponents are adjusted (based upon the outcome of mantissa calculations) in exponent adjustment logic 514. In multiplier 283, data are processed in multiply array 580 using conventional techniques (e.g., radix-4 Modified Booth Algorithm) and the output is processed in CPA 582. At the same time, data may be processed output may also be passed to in divide/square root logic 516 of divide/square root block 285. As shown in FIG. 2D, this CPA 582 through latch 506.

Finally, data pass to floating point adder 284 where it passes through multiplexers 518 controlled by exponent 286 based upon selection criteria described above. Data are processed by prescale adder 583 or massive cancellation adder 584, in accordance with well-known techniques, and passed through multiplexer 519 also controlled by exponent 286. The output from adders 583 or 584 is used to adjust the exponent values. Thereafter, the mantissa values from adder 284 and exponent values from exponent 286 are returned to pipe file 282, where the data may be packed by pack logic 522 into a memory format (compliant with IEEE 754, defined below) before being returned to register file 281. Alternatively, data may be bypassed through logic 508 into register file 524 and onto store bus 292.

Further discussion of FPU 270 and alternative embodiments are provided in the previously identified copending application Ser. Nos. 09/364,514, 09/364,512, 09/363,638, and 09/363,637.

Application Specific Extension to Instruction Set Architecture

Figure 3:
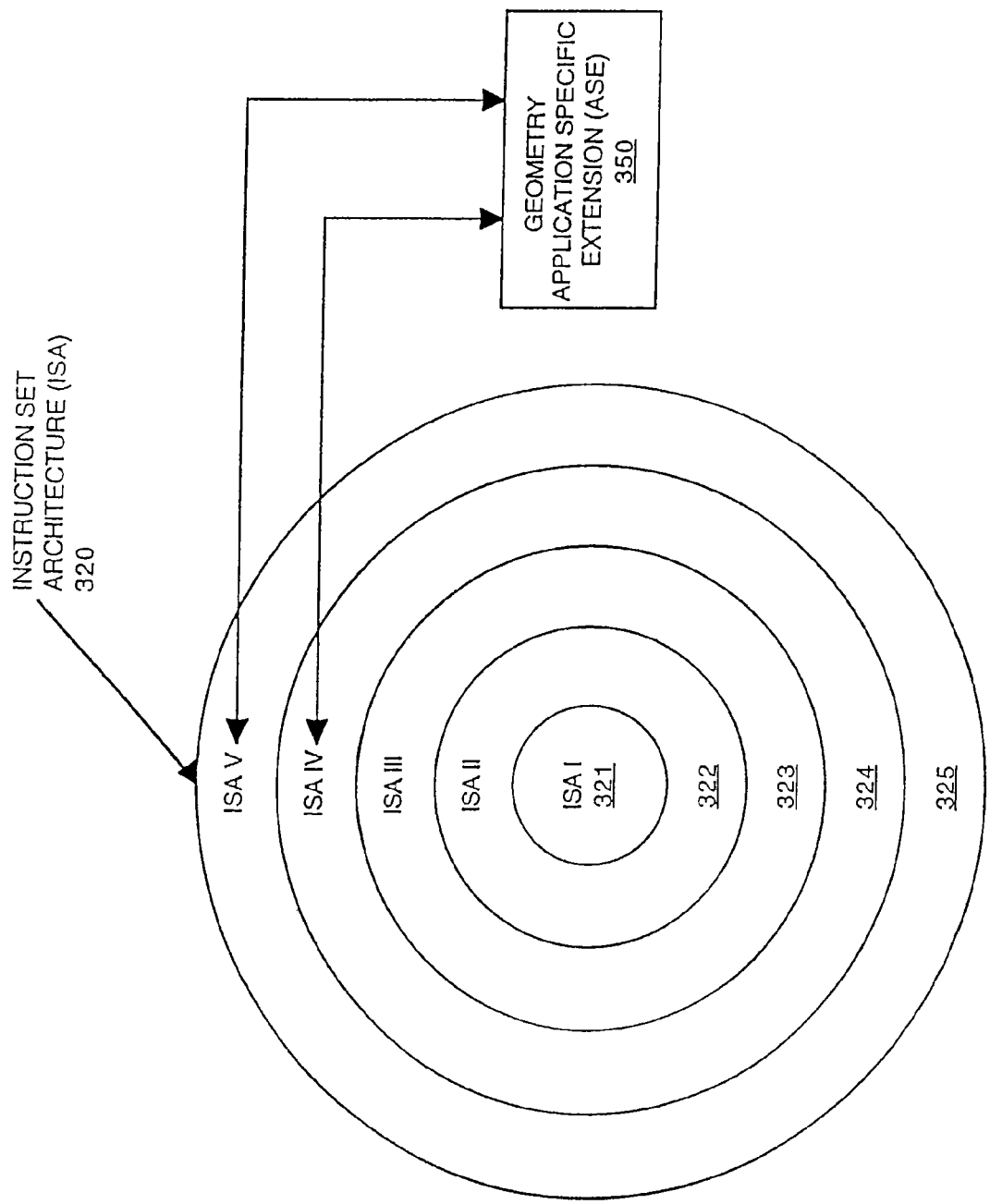
FIG. 3 is an illustration of the logical relationship between the levels of a general purpose instruction set architecture and a geometry application specific extension in accordance with one embodiment of the present invention.

FIG. 3 illustrates various levels of a general purpose instruction set architecture (ISA) 320 and the logical relationship between ISA 320 and a geometry application specific extension (ASE) 350 in accordance with the present invention. ISA, as the term is used here, includes the instruction set and at least a portion of the supporting architecture of a given processor. ISA 320 and geometry ASE 350 are implemented on a processor (e.g., processor 102*b* of FIG. 2B). Preferably, ISA 320 is embodied by the general purpose MIPS ISA (i.e., ISA I through V preferably corresponds directly with MIPS I through MIPS V which is available from MIPS Technologies, Inc., Mountain View, Calif.). MIPS I through MIPS V are discussed in D. Sweetman, See *MIPS Run*, Morgan Kaufman Publishers, Inc., San Francisco (1999), which is herein incorporated by reference in its entirety for all purposes. MIPS V introduces a paired-single data format (see FIG. 5).

With reference to FIG. 3, ISA 320 is shown having five levels; that is, there are four enhancements to the initial or core level. ISA I 321 represents the core reduced instruction set computer (RISC) architecture implemented by processor 102. ISA II 322 and ISA III 323 represent evolutionary changes made to ISA I 321, such as the introduction of 64-bit integers and addresses.

ISA IV 324 incorporates a set of high performance floating point operations including: multiply/add (e.g., MADD), multiply (e.g., MUL), and add. MADD and MUL are described in conjunction with FIGS. 8 and 9, respectively. ISA IV 324 also incorporates eight floating point condition code bits (7:0) into the floating point control/status register. ISA V 325 introduces a paired-single data format.

Geometry ASE 350 represents a set of instructions (i.e., the instructions of Table 1, above) that function with ISA 320, particularly with ISA IV 324 and ISA V 325, to help accelerate geometry calculations for computer-generated graphics design as well as for other applications. The floating point condition codes, the paired-single format, and the instruction set are further discussed below.

Exemplary Floating Point Control/Status Register

Figure 4:
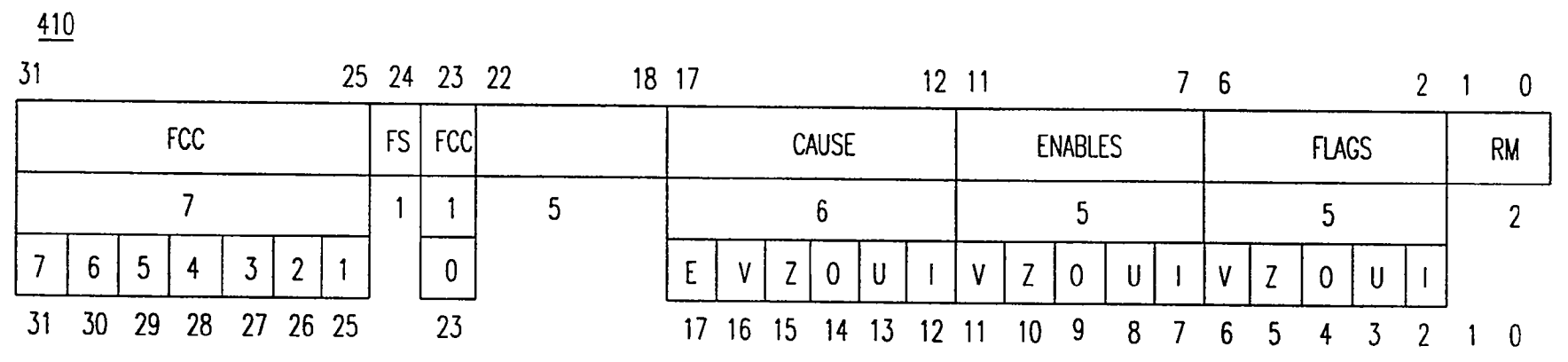

With reference to FIG. 4, an embodiment of the floating point control/status register (FCSR) 410 of FPU 270 (FIG. 2B) is shown; however, it is appreciated that other embodiments of a register can be used in accordance with the present invention. FCSR 410 corresponds to the ISA V format of the floating point control/status register. The fields shown in FCSR 410 are defined below:

FCC: the eight floating point condition codes, 7:0;
FS: enables the non-IEEE 754 mode (primarily used to flush denormalizations to zero) ("IEEE 754" is an abbreviation for ANSI/IEEE Standard 754-1985, "IEEE Standard for Binary Floating-Point Arithmetic");
Cause: designates the cause of a floating point error;
Enables: floating point error enable bits;
Flags: floating point error flag bits; and
RM: indicates the rounding mode to be used.

The floating point condition codes (FCC) are made up of eight bits that record the result of floating point (FP) compares (e.g., the result of the CABS instruction discussed below), and are tested for FP conditional branches (e.g., instructions BC1ANY2F, BC1ANY2T, BC1ANY4F, BC1ANY4T discussed below). The FCC bit(s) used is specified in the compare or branch instructions. The rounding mode (RM) bit indicates the rounding mode used for most floating point operations (some FP instructions use a specific rounding mode). The rounding modes are well known and identified as follows:

0: RN—Round to Nearest
1: RZ—Round Toward Zero
2: RP—Round Toward Plus Infinity
3: RM—Round Toward Minus Infinity.

An alternative embodiment of FCSR 410 is provided in previously-identified copending application Ser. No. 09/364, 512. In this embodiment, an additional control bit "FO" (Madd-flush-override bit) is provided to the FCSR. The combination of bits FS and FO enable an FPU (such as FPU 270) to selectively operate in up to three different modes; i.e., IEEE-compliant, Flush-to-zero and Madd-flush-override.

Paired-Single Data Format

Figure 5:
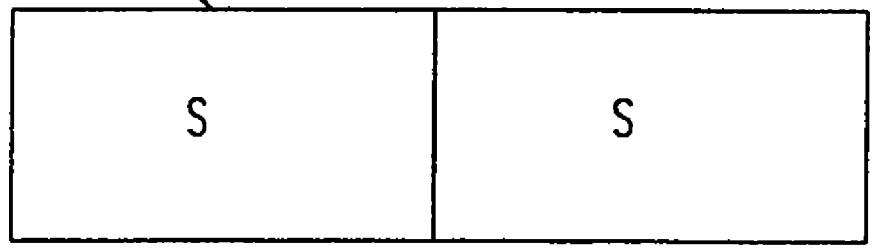
FIG. 5 is an illustration of a paired-single datatype utilized in accordance with one embodiment of the present invention.

FIG. 5 shows paired-single datatype 520 in accordance with the present invention. As a paired-single value, a 64-bit floating point register is interpreted to be a vector of two single-precision floating point numbers, S. In essence, the paired-single format is viewed as comprising two parallel pipelines. In the single precision format, only one of the pipelines is operating. In the paired-single format, each of the pipelines is operating on independent data in parallel (as in a SIMD architecture).

Paired-single datatype 520 allows a pair of operands to be retrieved with one data load operation. In addition, paired-single datatype 520 allows a pair of operations to be performed on those operands with one instruction. Hence, the use of paired-single datatype 520 can double the performance of a geometry engine.

Paired-single operations are intended to support computing applications which use well-behaved vectors of single-precision floating point numbers, including such applications as graphics geometry; audio, lighting, seismic, and general purpose imaging; and signal processing.

Geometry ASE—Arithmetic Instructions

Refer now to FIGS. 6A, 6B, 6C, 6D, 6E and 6F which each illustrate one of six arithmetic instructions implemented by geometry ASE 350 in accordance with one embodiment of the present invention. The arithmetic instructions are designated as, respectively, ADDR 601, MULR 602, RECIP1 603, RECIP2 604, RSQRT1 605 and RSQRT2 606. In each of these instructions, an operation code (e.g., COP1 together with a specified instruction such as ADDR.PS) is used to instruct the processor of the specific action to be performed. COP1 is used to indicate that the instruction is a floating point instruction. The processor (e.g., processor 102b of FIG. 2B) reads the COP1 field (in this embodiment, the six most significant bits), recognizes that the instruction is a floating point instruction, and directs the instruction to FPU 270 (FIG. 2B). FPU 270 then reads the field that specify the instruction (in this embodiment, the six least significant bits).

Each instruction also specifies (1) the input data (or the location of the input data) in fields "fs" and "ft," (2) the destination location of the data resulting from the application of the operation specified by the instruction (in field "fd"), and (3) the format of the input data in field "fint;" formats include paired-single ("PS"), single precision ("single" or "S"), and double precision ("double" or "D"). It is appreciated that other data formats and more than two input locations can be used in accordance with the present invention. In the present embodiment, each instruction is 32 bits in length. FIGS. 6A through 6F provided exemplary instruction formats for a variety of data formats (see "Format" for each figure).

ADDR

With reference to FIG. 6A, in a preferred embodiment, ADDR 601 performs a "reduction add" of two paired-single floating point (FP) values. ADDR 601 takes the indices to two data elements from the store specified by the instruction (e.g., a memory or a register file on the processor, such as FPU registers 241 of FIG. 2A and floating point register file 281 of FIG. 2C) and performs a reduction add operation on them. The result is then stored in a storage element specified in the destination index of the instruction. This instruction is executed in floating point adder 284 (FIG. 2C).

ADDR 601 provides additional flexibility with regard to how paired-single values in registers can be added. ADDR 601 eliminates processing steps to operate on paired-single values that were formerly required in order to achieve the same result provided by ADDR. ADDR 601 reduces the number of instructions by eliminating the need for format conversion instructions for an addition operation; for example, in accordance with the present invention, it is not necessary to convert a paired-single value to a pair of values in order to add them to another paired-single value. Also, ADDR 601 does not require that the contents of a register (containing, for example, a paired-single value) be moved to another register or registers before performing the addition operation.

In the present embodiment, ADDR 601 is designed to work in the paired-single format, providing two simultaneous operations on a pair of operands. For the paired-single format, the ADDR 601 instruction is represented as:

fd.PL<-ft.PU+ft.PL; and
fd.PU<-fs.PU+fs.PL;

where "fd" is the index specifying the destination register; "fit" and "fs" are two indices specifying two registers in the floating point register set whose contents are to be used as input data for the operation; the symbol "<-" is used to indicate that the value to the right of the symbol is assigned to a location indicated to the left of the symbol; "PL" indicates the lower value in a paired-single datatype format; and "PU" indicates the upper value in the paired-single datatype format. This computation is graphically illustrated in FIG. 7A, discussed below. It is appreciated that ADDR 601 can be used with data set formats other than the paired-single format such as quad-single (i.e., a 128-bit wide data interpreted as a vector with four single-precision floating point numbers), octal-single (i.e., a 256-bit wide data interpreted as a vector with eight single-precision floating point numbers), paired-double (i.e., a 128-bit wide data interpreted as a vector with two double-precision floating point numbers), quad-double (i.e., a 256-bit wide data interpreted as a vector with four double-precision floating point numbers), and so on. The quad-single format is further discussed in connection with FIG. 7B.

Continuing with reference to FIG. 6A, the paired-single values in the ft register are added together, and the result is put into the lower paired-single position of the destination register fd. Similarly, the paired-single values in the fs register are added together and the result is put into the upper paired-single position of the destination register fd. The sequence of operations that describe the ADDR 601 instruction is:

Read FPR[ft]
Read FPR[fs]
Reduction Add
Store result to FPR[fd]

In another embodiment, the data set format could instead comprise more than two single-precision floating point numbers; for example, it could comprise four single precision floating point values held in two registers. Similarly, in another embodiment more than two registers can be used with a corresponding change to the instruction format (to specify each of the input registers).

MULR

With reference to FIG. 6B, in a preferred embodiment, MULR 602 performs a "reduction multiply" of two paired-single FP values operation. MULR 602 takes the indices to two data elements from the store (e.g., a memory or a register file on the processor, such as FPU registers 241 of FIG. 2A and floating point register file 281 of FIG. 2C) specified by the instruction and performs a reduction multiply operation on them. This instruction is executed in floating point multiplier 283 (FIG. 2C). The result is then stored in a storage element specified in the destination index of the instruction.

MULR 602 provides additional flexibility with regard to how paired-single values in registers can be multiplied. MULR 602 eliminates processing steps to operate on paired-single values that were formerly required in order to achieve the same result provided by MULR. MULR 602 reduces the number of instructions by eliminating the need for format conversion instructions for a multiplication operation; for example, in accordance with the present invention, it is not necessary to convert a paired-single value to a pair of values in order to multiply them with another paired-single value. Also, MULR 602 does not require that the contents of a register (containing, for example, a paired-single value) be moved to another register or registers before performing the multiplication operation.

Figure 7A:
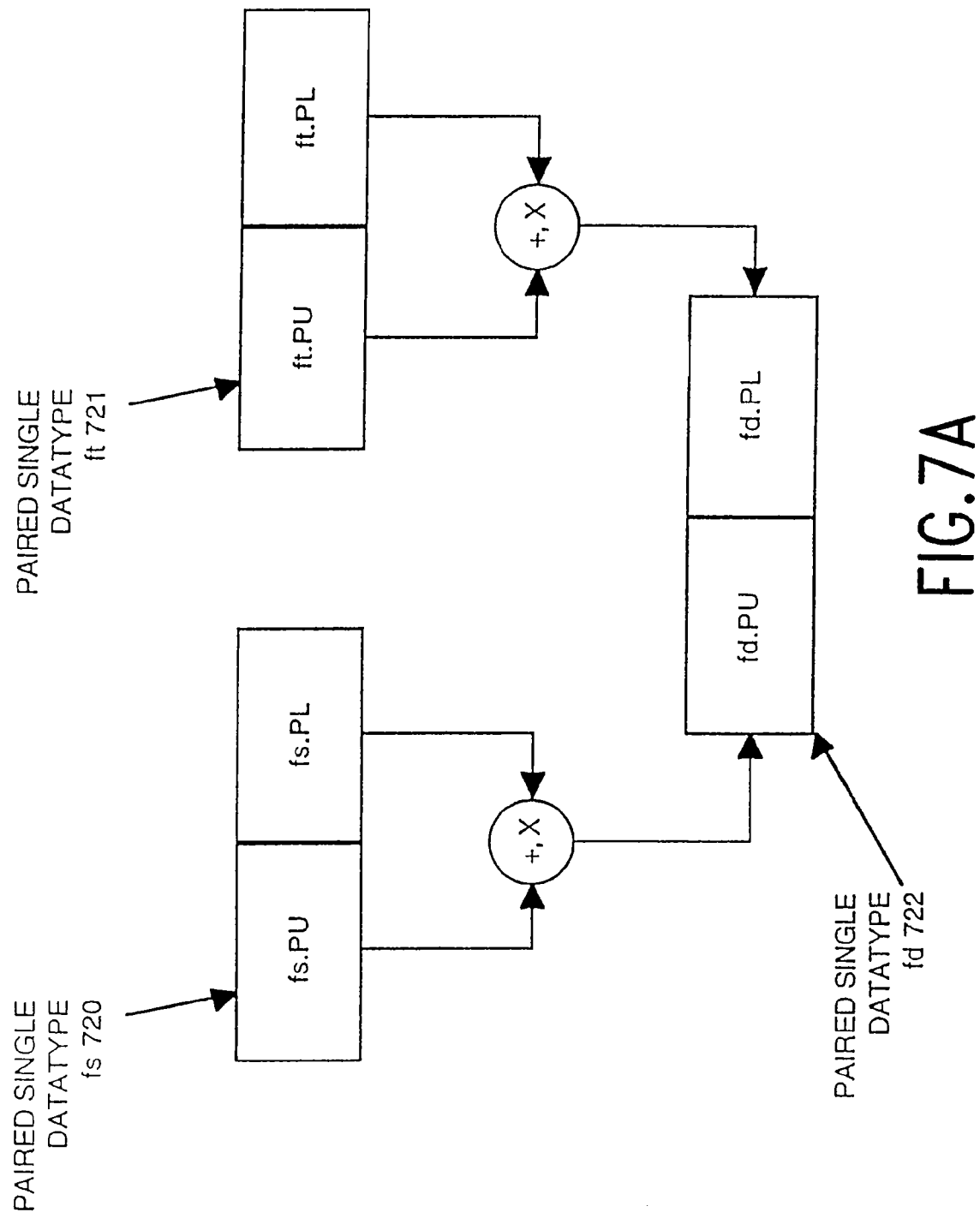
FIG. 7A is a data flow diagram for a reduction add operation and a reduction multiply operation using the paired-single data format in accordance with one embodiment of the present invention.

In the present embodiment, MULR 602 is designed to work in the paired-single format, providing two simultaneous operations on a pair of operands; in other embodiments, the single precision or double precision floating point formats may be used. The instruction is represented as:

fd.PL<-ft.PU*ft.PL; and
fd.PU<-fs.PU*fs.PL;

where the terms are as defined above. Refer to FIG. 7A below. It is appreciated that MULR 602 can be used with data set formats other than the paired-single format such as quad-single, octal-single, paired-double, quad-double, and so on. The quad-single format is further discussed in connection with FIG. 7B.

Continuing with reference to FIG. 6B, the paired-single values in the ft register are multiplied together, and the result is put into the lower paired-single position of the destination register fd. Similarly, the paired-single values in the fs register are multiplied together and the result is put into the upper paired-single position of the destination register fd. The sequence of operations that describe the MULR 602 instruction is:

Read FPR[ft]
Read FPR[fs]
Reduction Multiply
Store result in FPR[fd]

The result is calculated to infinite precision, rounded according to the current rounding mode (RM) specified in FCSR (e.g., FCSR 410 of FIG. 4). Any exceptional conditions generated by the two separate multiplies are "ORed" together.

In another embodiment, the data set format could instead comprise more than two single-precision floating point numbers; for example, it could comprise four single precision floating point values held in two registers. Similarly, in another embodiment more than two registers can be used with a corresponding change to the instruction format (to specify each of the input registers).

FIG. 7A illustrates the flow of data for the reduction add (e.g., ADDR 601 of FIG. 6A) and the reduction multiply (e.g., MULR 602 of FIG. 6B) instructions using the paired-single data format. For the reduction add instruction, the paired-single values ft.PU and ft.PL in ft register 721 are added together, and the result is put into the lower paired-single position fd.PL of destination register fd 722. Similarly, the paired-single values fs.PU and fs.PL in fs register 720 are added together and the result is put into the upper paired-single position fd.PU of destination register fd 722. The flow of data for the reduction multiply instruction is the same as for the reduction add instruction.

Figure 6J:
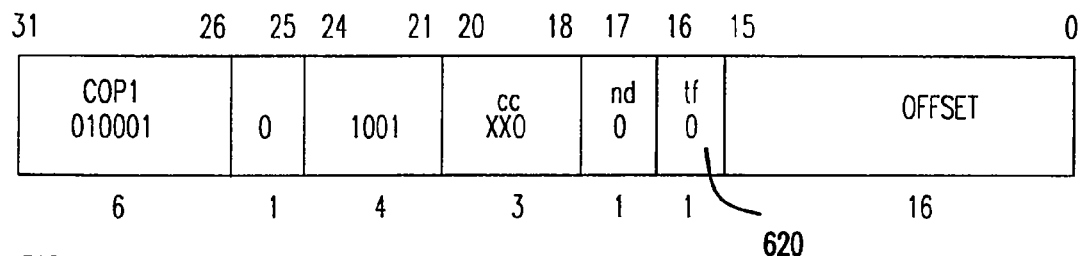
FIGS. 6J, 6K, 6L and 6M illustrate an embodiment of each of the conditional branch instructions implemented by the geometry application specific extension of FIG. 3 in accordance with the present invention.
Figure 7B:
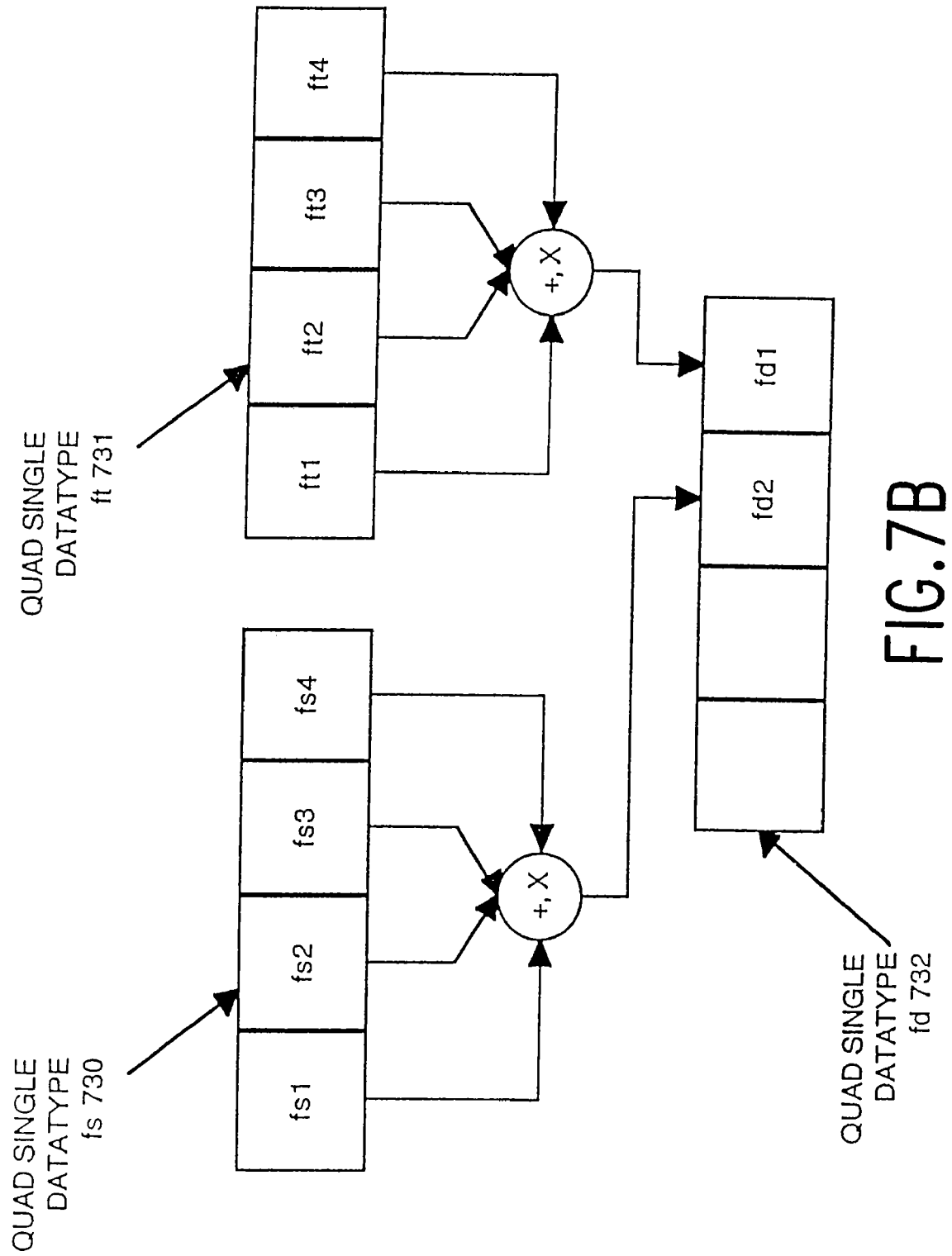
FIG. 7B is a data flow diagram for a reduction add operation and a reduction multiply operation using the quad-single data format in accordance with one embodiment of the present invention.

FIG. 7B illustrates the flow of data for the reduction add (e.g., ADDR 601 of FIG. 6A) and the reduction multiply (e.g., MULR 602 of FIG. 6B) instructions using the quad-single data format. This format may be used, for example, in 128-bit wide data paths. For the reduction add instruction, the quad-single values ft1, ft2, ft3 and ft4 (which may be, for example, 32 bits each) in ft register 731 are added together, and the result is put into the quad-single position fd1 of destination register fd 732. Similarly, the quad-single values fs1, fs2, fs3 and fs4 in fs register 730 are added together and the result is put into the quad-single position fd2 of destination register fd 732. Thus, when a reduction add operation is performed for two quad-single registers in accordance with the present invention, a paired-single result is obtained. Note, however, that a reduction add operation can be performed using two more quad-single input registers in a similar manner as just described, and the results can be placed into the two remaining positions in destination register fd 732. The flow of data for the reduction multiply instruction is the same as for the reduction add instruction.

It is understood that the operations discussed above for reduction add and reduction multiply can be extended to a reduction subtract instruction and to a reduction divide instruction. These reduction instructions (like all other instructions described herein) may be used in any combination or sequence of instructions when being executed by a processor. Significantly, the reduction computations described herein combine operands from two source locations and load the result into a third location (see FIGS. 7A and 7B). The contents of the source locations (e.g., registers) are therefore preserved even after the reduction computation is complete, allowing subsequent operations the flexibility of using this same source data (and thereby avoiding such inefficiencies as reloading the source data from memory if needed by a subsequent instruction).

As would be apparent to one having ordinary skill in the art, in an alternative embodiment the quad-single data format can be used with any of the floating point instructions described below (e.g., RECIP1, RECIP2, RSQRT1, RSQRT2, CABS, CVT.xx.xx). Typically, such a data format will be used with a system architecture that employs four parallel processing pipelines, each having 32-bit wide data paths. The instructions may be formatted for 128-bit wide registers, resulting in no change to the number of operand fields in the current instruction formats (e.g., fs and ft remain the same for a given instruction). Alternatively, the instructions may be formatted for additional 32-bit wide registers, resulting in new operand fields being added to current instruction formats. The data format for these instructions can, of course, be further extended to wider formats (e.g., octal-single, processing 256-bit wide data, etc.) and different format types (e.g., paired-double, quad-double, etc.) to accommodate supporting hardware.

RECIP1 and RECIP2

With reference to FIGS. 6C and 6D, RECIP1 603 is used as a seed instruction to generate a reduced precision reciprocal of a floating point value. RECIP2 604 iterates on the reduced precision result to obtain a full precision reciprocal value. In some applications, the reduced precision of RECIP1 603 is sufficient and RECIP2 604 is not used. In other applications, for example when more precision is desired, RECIP2 604 may also be used.

With reference to FIG. 6C, RECIP1 603 generates a reduced precision reciprocal of a FP value. That is, RECIP1 603 takes the index of one data element from the store and finds the reciprocal of this data value. The reciprocal may be obtained in various ways; in the present embodiment, the reciprocal is obtained from a lookup table. The use of a lookup table accelerates the calculation of the reciprocal of a data value, and thus improves the overall performance of the geometry engine. The result is then stored in a storage element that is specified in the destination index of the instruction. The reciprocal is of reduced precision relative to the input data format. The numeric accuracy of this operation is implementation dependent.

More specifically, RECIP1 603 uses an improved piece-wise linear approximation which requires a table lookup, operand modification and multiplication. This approximation may be mathematically expressed by the following equation:

$$1/B \approx A1' * B';$$

where $A1'$ is a predefined coefficient obtained from a lookup table (which holds a number of coefficients) and $B'$ is a modified version of an input operand B. In accordance with a preferred embodiment, FPU 270 (FIG. 2C) includes a 64-word lookup table that generates a 17-bit coefficient $A1'$. As indicated in the above equation, this coefficient is multiplied by a modified version of the input operand to produce an initial approximation, which in this embodiment is a reduced-precision result accurate to approximately 14 bits. This multiplication is computed in the multistage pipeline of floating point multiplier 283 and floating point adder 284 of FPU 270 (FIG. 2C).

It would be apparent to those having ordinary skill in the art that lookup tables of varying sizes may be used. For example, a 128-word lookup table may be used for RECIP1 which could produce a reduced precision result accurate to approximately 15 bits.

In the present embodiment, the lookup table and input operand for RECIP1 utilize the reciprocal approximation method described in M. Ito, N. Takagi and S. Yajima, "Efficient Initial Approximation for Multiplicative Division and Square Root by a Multiplication with Operand Modification," *IEEE Transactions on Computers*, Vol. 46, No. 4, pp. 495 498, April 1997, which is herein incorporated by reference in its entirety for all purposes. According to this referenced method, the coefficients (A1') contained in the lookup table and the modified input operand (B') are defined by the following equations, respectively:

$$A1' = 1/(P*(P+2^{-m})) - 2^{-2m-3} * p^{-4}$$

$$B' = [1.b_1, b_2, \ldots b_m, \overline{b_{m+1}}, \overline{b_{m+2}}, \ldots \overline{b_n}]$$

As the foregoing illustrates, B' is obtained from B by inverting its n–m least significant bits. A1' is obtained by a table lookup on the most significant fractional bits of B, such that $P=[1.b_1, b_2, \ldots b_m]$. The least significant bits of B can be inverted while the table lookup is being performed. And, as noted above, 1/B is approximated by multiplying A1' with B'. In a preferred embodiment, B includes a 23 bit mantissa. The six most significant bits (MSBs) of this mantissa are used to access the 64-word lookup table mentioned above. The remaining 17 bits are inverted and concatenated with the 6 MSBs to form B', which is multiplied with the coefficient (A1') accessed from the lookup table to produce a reduced precision reciprocal pursuant to RECIP1 603.

In a preferred embodiment, RECIP1 603 is designed to work in a paired-single data format; however, it is appreciated that in other embodiments, other formats such as a single or double FP format can be used. The double FP format uses twice the number of bits as the single FP format, and hence is used to obtain more bits of precision when storing and manipulating data. An operation that can operate using a double FP format thus preserves the higher precision of the data.

Figure 2E:
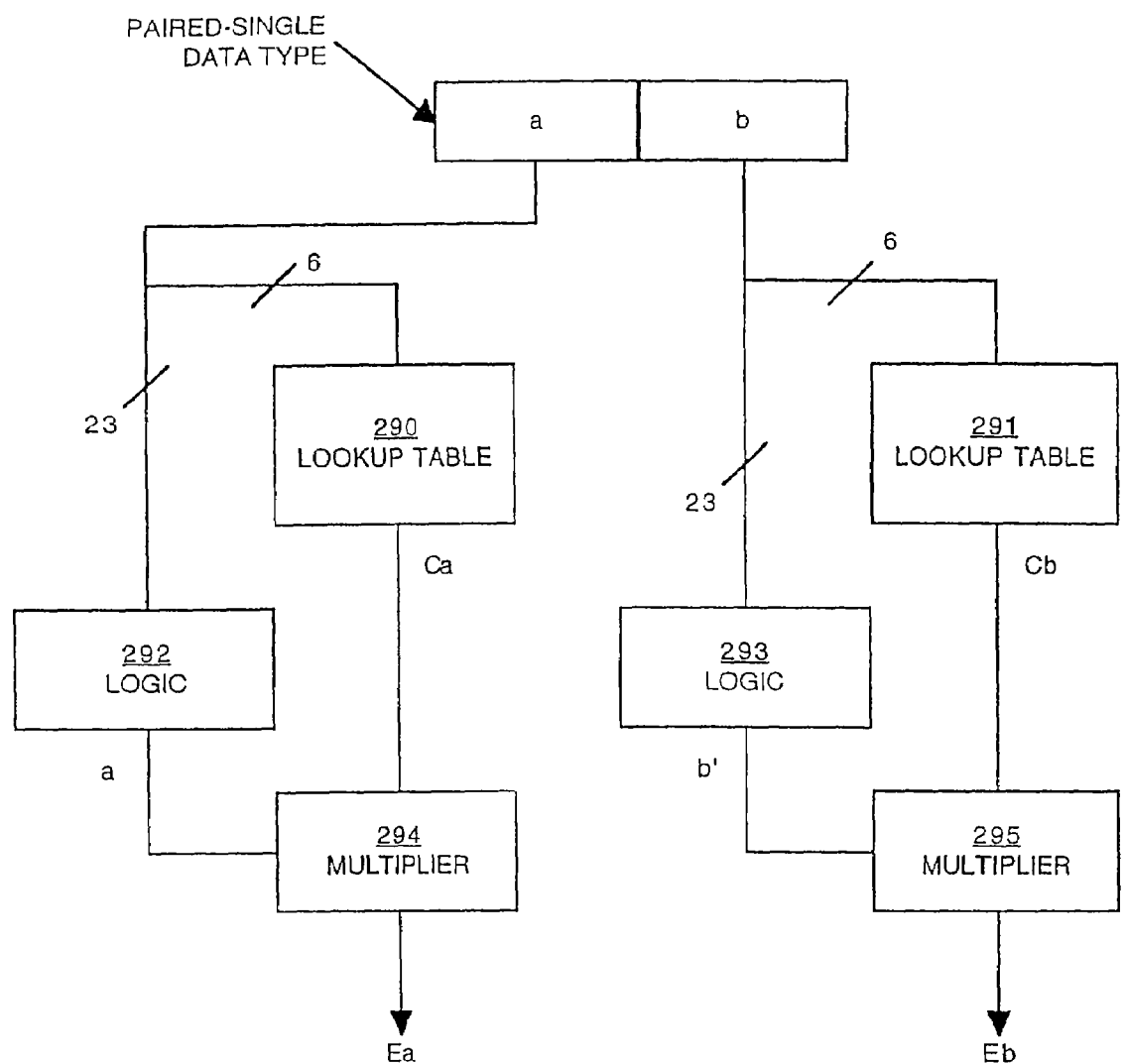
FIG. 2E is a block diagram illustrating an exemplary Single Instruction Stream—Multiple Data Stream (SIMD) architecture.

In the paired-single format, a second lookup table is preferably used (operating in parallel with the first) in accordance with a standard SIMD architecture. For example, with reference to FIG. 2E, 64-word lookup tables 290 and 291 are shown operating in parallel. In accordance with the foregoing discussion, six bits of input operands "a" and "b" (in paired-single data format) are used to access these tables concurrently to generate coefficients Ca and Cb, respectively. At about the same time, the 23-bit mantissas of each input value are provided to conventional logic blocks 292 and 293 to produce modified input operands a' and b' (as described above in conjunction with B1'), respectively. These values are multiplied with coefficients Ca and Cb in multipliers 294 and 295, respectively, to produce estimated values Ea and Eb.

Alternatively, the RECIP1 603 operation may be performed twice using a single lookup table (once for each vector or operand) to accommodate a paired-single data type. In such operation, RECIP1 may still be configured as a PS data type (i.e., RECIP1.PS); there is no need to convert the data and change instruction formats to single precision. In this situation, lookups are performed serially for the upper and lower-half operands.

A format conversion (e.g., using instruction CVT.PS.S, as discussed below) is necessary if the paired-single format is to be processed with a RECIP1 603 operating in single floating point format (e.g., in a processor without a second lookup table). An example of this operation is provided below. Hence, paired-single to single format conversion can be avoided if RECIP1 603 is executed in paired-single format.

RECIP1 603 is represented as:

fd<-1.0/fs;

where the terms are as defined above. This instruction specifies the input data value in the floating point register fs. The contents of fs are read and the reduced precision reciprocal of this value is obtained, and the result is put into the destination floating point register fd.

The sequence of operations that describe the RECIP1 603 instruction is:

Read FPR[fs]

Find Reciprocal

Store result in FPR[fd]

With reference to FIG. 6D, RECIP2 604 is the second step in the instruction sequence for generating a full precision reciprocal FP value. This operation and the result are designed to work in the single, double or paired-single formats. RECIP2 604 takes the result of RECIP1 603 and iterates (preferably using the Newton-Raphson method) toward the full precision reciprocal FP value. The numeric accuracy of this operation is implementation dependent. (Newton-Raphson is a fundamental trial and error method for finding the root of an equation. It is well known to use this method in computing floating point reciprocal and square root values.)

RECIP2 604 is represented as:

fd<-(iterate) fs and ft.

This instruction specifies the input data value in the floating point registers fs and ft. As discussed below, RECIP2 604 is used in combination with MADD 801 (described below) to effect iterative calculations (in accordance with Newton-Raphson) to achieve a full-precision reciprocal of the input data value. Additional details are provided in the exemplary instruction sequences provided below.

In the present embodiment, RECIP2 604 is implemented as an improvement to the known NMSUB instruction. The NMSUB instruction is represented as:

fd<--((fs×ft)−fr), where fd designates the destination register, and fs, ft and fr designate registers in the floating point register set whose contents are to be used as input data for the operation. In the present embodiment of the present invention, the fr operand is hardwired to a constant value of 1.0; thus, a value of 1.0 is subtracted from (fs×ft) when fr is hardwired to be 1.0. Thus, in accordance with the present invention, a variable and its associated register location are eliminated; therefore, the processing steps formerly needed to retrieve a value from fr is also eliminated, thereby eliminating or freeing up a register.

In addition, the precision of the calculation may be improved, as follows: let "b" be the value whose reciprocal is to be approximated, and let "$x_i$" be the reduced precision value determined using RECIP1 603. Then, $$x_{i+1} = x_i * (2 - bx_i)$$
$$= x_i * (1 - bx_i) + x_i.$$

(1) (Newton-Raphson algorithm for approximating the reciprocal value of b)

(2) Newton-Raphson; effected by RECIP2 and MADD)

Equation (1) results in a term "(2−$bx_i$)" which is frequently close to 1.0 (such as 1.0000 . . . nnnn . . . , where nnnn is the correction adjustment and the number of interest). This format can result in a loss of precision. In contrast, in equation (2), the term "(1−$bx_i$)" is first determined (using RECIP2 604). By subtracting 1.0 in RECIP2 604, the resulting number is typically very small and can be normalized (as n.nnn . . . ) to achieve greater precision. Therefore, subsequent calculations are more precise and denormalization may be avoided. This technique is further discussed in copending application Ser. No. 09/363,637.

In a preferred embodiment, RECIP2 604 provides the means to obtain the full precision reciprocal result using the exemplary instruction sequences provided below for the paired-single format; however, it is appreciated that in other embodiments, other data formats such as the single or double floating point format can be used.

One or two Newton-Raphson iterations are used to improve the seed approximations to produce single and double precision results, respectively. These operations are carried out in the pipelines of floating point multiplier 283 and floating point adder 284 of FPU 270 (FIG. 2C).

It is also appreciated that RECIP1 603 and RECIP2 604 can be used with data set formats other than the paired-single format such as quad-single or octal-single; in these implementations, additional lookup tables can be used for the RECIP1 603 operation or the RECIP1 603 operation can be repeated using a single lookup table. For example, with the quad-single data format, four lookup tables can be used, or the RECIP1 603 operation can be performed four times using a single lookup table.

As will be seen from the discussion below, the use of the paired-single format for RECIP1 603 and RECIP2 604 in accordance with the present invention reduces the number of instructions needed by eliminating one or more convert instructions otherwise required prior to or during the RECIP1/RECIP2 operations. For example, other operations in the graphics pipeline can be performed using the paired-single format and there is no need to convert the results from those operations in order to use them for the RECIP1/RECIP2 operations.

In the examples below, an instruction is specified using three fields: a mnemonic that represents the operation to be performed; the destination (or output) register; and a set of input registers. For example, in the instruction:

MADD f3,f2,f1,f0;

where MADD is the mnemonic, f3 is the output register, and f2, f1, f0 are the input registers. Note that the number of input registers specified depends on the operation.

With reference to FIGS. 6C and 6D, an exemplary instruction sequence for the single FP format (format S) is provided below. The example illustrates the use of the single FP version of RECIP1 603, RECIP2 604 and MADD 801 (FIG. 8) to produce a single FP reciprocal of a single FP value. A value "b" is assumed to be in register f0. RECIP1 603, using a 128-word lookup table, produces a reduced precision result accurate to approximately 15 bits. At the end of the exemplary instruction sequence shown below, register f3 contains the full precision 24-bit reciprocal 1/b. (In the instruction sequences below, f0, f1, f2 and f3 refer to floating point registers, FPRs.) Instruction formats for RECIP1, RECIP2 and MADD are provided in FIGS. 6C, 6D and 8, respectively.

| RECIP1.S | f1, f0 | [approximately 15-bit 1/b] |
|---|---|---|
| RECIP2.S | f2, f1, f0 | [–(b * f1 – 1.0)] |
| MADD.S | f3, f1, f1, f2 | [24-bit 1/b] |

In an alternative single precision embodiment, a 64-word lookup table is used producing a reduced precision reciprocal value accurate to approximately 14 bits (using RECIP1.S). The accuracy of the value is increased to 24 bits after performing RECIP2.S and MADD.S.

An exemplary instruction sequence for the double FP format (format D) is provided below. The example illustrates the use of the double FP version of RECIP1 603, RECIP2 604 and MADD 801 to produce a double FP reciprocal of a double FP value. A value "b" is assumed to be in register f0. RECIP1 603 uses a 128-word lookup table which is accurate up to approximately 15 bits. In the present embodiment, the instruction sequence below produces a full precision 53-bit result using the double FP format. (In the exemplary instruction sequences below, f4 and f5 refer to FPRs.)

| RECIP1.D | f1, f0 | [approximately 15-bit 1/b] |
|---|---|---|
| RECIP2.D | f2, f1, f0 | [–(b * f1 – 1.0)] |
| MADD.D | f3, f1, f1, f2 | [approximately 29-bit 1/b] |
| RECIP2.D | f4, f3, f0 | [–(b * f3 – 1.0)] |
| MADD.D | f5, f3, f3, f4 | [53-bit 1/b] |

In an alternative double precision embodiment, a 64-word lookup table is used producing a reduced precision reciprocal value accurate to approximately 14 bits (using RECIP1.D). The accuracy of the value is increased to approximately 27 bits after performing RECIP2.D and MADD.D. Finally, the accuracy is increased to a full precision 53-bit result after a second pass of RECIP2.D and MADD.D.

An exemplary instruction sequence using the paired-single format (format PS) for RECIP1 603, RECIP2 604 and MADD 801 is provided below. The example illustrates the use of the paired-single FP version of RECIP1, RECIP2 and MADD to produce a full precision paired-single FP reciprocal of a paired-single FP value. In this embodiment, the underlying hardware includes two 128-word lookup tables (for RECIP1.PS) configured in conventional SIMD architecture to process both reduced precision operations concurrently. In an alternate embodiment, the reduced precision operations can be processed sequentially using a single lookup table. Values "a" and "b" are assumed to be two single FP values in the paired-single format in register f0.

| RECIP1.PS | f1, f0 | [approximately 15-bit 1/a and 1/b] |
|---|---|---|
| RECIP2.PS | f2, f1, f0 | [–(a * f1 – 1.0) and –(b * f1 – 1.0)] |
| MADD.PS | f3, f1, f1, f2 | [24-bit 1/a and 1/b] |

An exemplary instruction sequence using the single FP format for RECIP1 603 and the paired-single format for RECIP2 604 and MADD 801 is provided below. The example illustrates the use of the single FP version of RECIP1 and the paired-single FP version of RECIP2 and MADD to produce a paired-single FP reciprocal of two single FP values. Values "a" and "b" are assumed to be two single FP values in registers f0 and f1, respectively. (In the instruction sequences below, f6 and f7 refer to FPRs.)

| RECIP1.S | f2, f0 | [f2 gets reduced precision 1/a] |
|---|---|---|
| RECIP1.S | f3, f1 | [f3 gets reduced precision 1/b] |
| CVT.PS.S | f4, f1, f0 | [f4 holds PS values b\|a] |
| CVT.PS.S | f5, f3, f2 | [f5 holds PS seed 1/b\|1/a] |
| RECIP2.PS | f6, f5, f4 | [f6 holds intermediate 1/b\|1/a] |
| MADD.PS | f7, f5, f5, f6 | [f7 holds full precision PS 1/b\|1/a] |

With reference to FIG. 10, in the present embodiment, instruction CVT.PS.S 1001 converts two single precision values to a paired single value. CVT.PS.S 1001 is represented as:

fd<-fs$_{31...0}$||ft$_{31...0}$;

where the terms are as defined above. This instruction writes the single-precision values in FPR fs and ft into FPR fd as a paired-single value. The value in FPR fs is written into the upper half, and the value in FPR ft is written into the lower half.

RSQRT1 and RSQRT2

With reference to FIGS. 6E and 6F, RSQRT1 605 is used as a seed instruction to generate a reduced precision reciprocal square root of a floating point value. RSQRT2 606 iterates on the reduced precision result to obtain a full precision reciprocal square root value. In some applications, the reduced precision of RSQRT1 605 is sufficient and RSQRT2 606 is not used. In other applications, for example when more precision is desired, RSQRT2 606 may also be used.

With reference to FIG. 6E, RSQRT1 605 generates a reduced-precision reciprocal of the square root of a FP value. That is, RSQRT1 605 takes the index of one data element from the store and finds the reciprocal of the square root of the specified data value. The reciprocal square root may be obtained in various ways; in the present embodiment, the reciprocal square root is obtained from a lookup table. The use of a lookup table accelerates the calculation of the reciprocal square root of a data value, and thus improves the overall performance of the geometry engine. The result is then stored in a storage element that is specified in the destination index of the instruction. The reciprocal square root is of reduced precision relative to the input data format. The numeric accuracy of this operation is implementation dependent.

More specifically, RSQRT1 605 (like RECIP1) uses a modified piecewise linear approximation which requires a table lookup, operand modification and multiplication. This approximation may be mathematically expressed by the following equation:

$$1/(B)^{0.5} \approx C1'*B'';$$

where C1' is a predefined coefficient obtained from a lookup table (which holds a number of coefficients) and B'' is a modified version of an input operand B. In accordance with a preferred embodiment, FPU 270 (FIG. 2C) includes a 64-word lookup table that generates a 17-bit coefficient C1'. As indicated in the above equation, this coefficient is multiplied by a modified version of the input operand (B'') to produce an initial approximation, which in this embodiment is a reduced-precision result accurate to approximately 14 bits. This multiplication is computed in FPU 270 (FIG. 2C).

It would be apparent to those having ordinary skill in the art that lookup tables of varying sizes may be used. For example, a 128-word lookup table may be used for RSQRT1 which could produce a reduced-precision result accurate to approximately 15 bits.

In the present embodiment, the lookup table and input operand for RSQRT1 utilize the reciprocal approximation method described in M. Ito, N. Takagi and S. Yajima, "Efficient Initial Approximation for Multiplicative Division and Square Root by a Multiplication with Operand Modification," *IEEE Transactions on Computers*, Vol. 46, No. 4, pp. 495-498, April 1997, which is herein incorporated by reference in its entirety for all purposes. According to this referenced method, the coefficients contained in the lookup table and the modified input operand are defined by the following equations, respectively:

$$C1' = 2^m(1/(U)^{0.5} - 1/(U+2^{-m+1})^{0.5}) - 7*2^{-2m-4}*U^{-7/2}$$

$$B'' = [1.b_1, b_2, \ldots b_{m-1}, \overline{b_m}, b_m, \overline{b_{m+1}}, \overline{b_{m+2}}, \ldots \overline{b_{n-1}}];$$

where $U=[1.b_1, b_2, \ldots b_{m-1}]$. C1' is obtained by an m-bit table lookup on the m−1 most significant fractional bits of B and the least significant exponent bit $e_0$. When $e_0$ equals 1, C1' should be multiplied by $(2)^{-0.5}$ before rounding and storing in the table. B'' is obtained from B by inverting its n−m least significant bits and rearranging some of its bits. In a preferred embodiment, B includes a 23 bit mantissa. The five most significant bits (MSBs) of this mantissa and the least significant bit of the corresponding exponent are used to access the 64-word lookup table mentioned above. The remaining 18 bits are inverted and concatenated with the five MSBs to form B'', which is multiplied with the coefficient (C1') accessed from the lookup table to produce a reduced-precision reciprocal square root pursuant to RSQRT1 605.

In a preferred embodiment, RSQRT1 605 is designed to work in the paired-single format; however, it is appreciated that in other embodiments, other formats such as a single or double FP format can be used. In the paired-single format, a second lookup table is preferably used (operating in parallel with the first) in accordance with standard SIMD architecture. The parallel lookup tables of FIG. 2E (and the discussion provided above) applies equally to RSQRT1 operating in paired-single format. However, as required by the equations associated with each operation (i.e., RECIP1 and RSQRT1), the actual values of the coefficients (accessed from the tables) and modified operand values (generated by the conventional logic blocks) will be different for each operation.

Alternatively, the RSQRT1 605 operation may be performed twice using a single lookup table (once for each vector or operand) to accommodate a paired-single data type. In such operation (like RECIP1), RSQRT1 may still be configured as a PS data type (i.e., RSQRT1.PS); there is no need to convert the data and change instruction formats to single precision. In this situation, lookups are performed serially for the upper and lower-half operands.

A format conversion (e.g., using instruction CVT.PS.S, as discussed below) is necessary if the paired-single format is to be processed with a RSQRT1 605 instruction operating in single floating point format (e.g., in a processor without a second lookup table). An example of this operation is provided below. Hence, like RECIP1 603, paired-single to single format conversion can be avoided if RSQRT1 605 is executed in paired-single format.

RSQRT1 605 is represented as:

fd<-1.0/sqrt(fs).

This instruction specifies the input data value in the floating point register fs. The contents of fs are read and the reduced precision reciprocal square root of this value is obtained, and the result is put into the destination floating point register fd. The sequence of operations that describe the RSQRT1 605 instruction is:

Read FPR[fs]
Find Reciprocal Square Root
Store result in FPR[fd]

With reference to FIG. 6F, RSQRT2 606 is the second step in the instruction sequence for generating the full precision reciprocal square root FP value. This operation and the result are designed to work in the single, double or paired-single formats. RSQRT2 606 takes the result of RSQRT1 605 and iterates (preferably using the Newton-Raphson method) toward the full precision reciprocal square root FP value. Additional details are provided in the exemplary instruction sequences provided below. The numeric accuracy of this operation is implementation dependent.

RSQRT2 606 is represented as:

fd<-(iterate)fs and ft.

This instruction specifies the input data value in the floating point registers fs and ft. As discussed below, this instruction is used in combination with MUL 901 and MADD 801 to effect iterative calculations (in accordance with Newton-Raphson) to achieve a full precision reciprocal square root. Additional details are provided in the exemplary instruction sequences provided below.

In the present embodiment, RSQRT2 606 is implemented as an improvement to the known NMSUB instruction divided by two. The NMSUB instruction is represented as:

fd<--((fs×ft)−fr), where fd designates the destination register, and fs, ft and fr designate registers in the floating point register set whose contents are to be used as input data for the operation. In the present embodiment of the present invention, the fr operand is hardwired to a constant value of 1.0; thus, a value of 1.0 is subtracted from (fs×ft) when fr is hardwired to be 1.0. Thus, in accordance with the present invention, a variable and its associated register location are eliminated; therefore, the processing steps formerly needed to retrieve a value from fr is also eliminated thereby eliminating or freeing up a register. Additionally, in accordance with RSQRT2 606, the quantity is divided by two.

The precision of the calculation may be improved, as follows: let "b" be the value whose reciprocal square root is to be approximated, and let "$x_i$" be the reduced precision value determined using RSQRT1 605. Then, $$x_{i+1} = (x_i * (3 - bx_i^2))/2$$
$$= x_i * ((1 - bx_i * x_i)/2) + x_i.$$

(3) (Newton-Raphson algorithm for approximating the reciprocal square root of a value b)
(4) (Newton-raphson; effected by MUL, RSQRT2 and MADD)

Equation (3) has a term $x_i^2$. If b is a very large number, $x_i^2$ can initially create a denormalized number. In contrast, in equation (4) the term "$(1-bx_i*x_i)/2$" is determined using RSQRT2 606 in a sequence of instructions (as set out below) where b is first multiplied with $x_i$. This order of operation can pull the quantity "$b*x_i$" back to a sufficiently normal range so that subsequent multiplication with $x_i$ may not create denormalization. This technique is further discussed in copending application Ser. No. 09/363,637. This operation is computed in the pipelines of floating point multiplier 283 and floating point adder 284 of FPU 270 (FIG. 2C).

In a preferred embodiment, RSQRT2 606 provides the means to obtain the full precision reciprocal square root result using the exemplary instruction sequences provided below for the paired-single format; however, it is appreciated that in other embodiments, RSQRT2 606 can be used with other data formats such as the single FP or double FP formats. One or two Newton-Raphson iterations are used to improve the seed approximations to produce single and double precision results, respectively.

It is also appreciated that RSQRT1 605 and RSQRT2 606 can be used with data set formats other than the paired-single format such as quad-single or octal-single; in these implementations, additional lookup tables can be used for the RSQRT1 605 operation or the RSQRT1 605 operation can be repeated using a single lookup table. For example, with the quad-single data format, four lookup tables can be used, or the RSQRT1 605 operation can be performed four times using a single lookup table.

As will be seen from the discussion below, the use of the paired-single format for RSQRT1 605 and RSQRT2 606 in accordance with the present invention reduces the number of instructions needed by eliminating one or more convert instructions otherwise required prior to or during the RSQRT1/RSQRT2 operations. For example, other operations in the graphics pipeline can be performed using the paired-single format and there is no need to convert the results from those operations in order to use them for the RSQRT1/RSQRT2 operations.

With references to FIGS. 6E and 6F, an exemplary instruction sequence for the single FP format (format S) is provided below. The example illustrates the use of the single FP version of RSQRT1 605, RSQRT2 606, MADD 801 (FIG. 8) and MUL 901 (FIG. 9) to produce a single FP reciprocal square root of a single FP value. A value "b" is assumed to be in register f0. RSQRT1 605, using a 128-word lookup table, produces a reduced precision result accurate to approximately 15 bits. At the end of the exemplary instruction sequence shown below, register f4 contains the full precision 24-bit reciprocal 1/b.

| RSQRT1.S | f1, f0 | [approximately 15-bit 1/sqrt(b)] |
| MUL.S | f2, f1, f0 | [f1 * f0] |
| RSQRT2.S | f3, f2, f1 | [−(f1 * f2 − 1.0)/2] |
| MADD.S | f4, f1, f1, f3 | [24-bit 1/sqrt(b)] |

In an alternative single precision embodiment, a 64-word lookup table is used producing a reduced precision reciprocal square root value accurate to approximately 14 bits (using RSQRT1). The accuracy of the value is increased to 24 bits after performing MUL.S, RSQRT2.S and MADD.S.

An exemplary instruction sequence for the double FP format (format D) is provided below. The example illustrates the use of the double FP version of RSQRT1 605, RSQRT2 606, MADD 801 and MUL 901 to produce a double FP reciprocal square root of a double FP value. A value "b" is assumed to be in register f0. RSQRT1 uses a 128-word lookup table which is accurate up to approximately 15 bits. In the present embodiment, the instruction sequence below produces a 53-bit result using the double FP format.

| RSQRT1.D | f1, f0 | [approximately 15-bit 1/sqrt(b)] |
| MUL.D | f2, f1, f0 | [f1 * f0] |
| RSQRT2.D | f3, f2, f1 | [−(f1 * f2 − 1.0)/2] |
| MADD.D | f4, f1, f1, f3 | [approximately 29-bit 1/sqrt(b)] |
| MUL.D | f5, f0, f4 | [f4 * f0] |
| RSQRT2.D | f6, f5, f4 | [−(f4 * f5 − 1.0)/2] |
| MADD.D | f7, f4, f4, f6 | [53-bit 1/sqrt(b)] |

In an alternative double precision embodiment, a 64-word lookup table is used producing a reduced precision reciprocal value accurate to approximately 14 bits (using RSQRT1.D). The accuracy of the value is increased to approximately 27 bits after performing MUL.D, RSQRT2.D and MADD.D. Finally, the accuracy is increased to a full precision 53-bit result after a second pass of MUL.D, RSQRT2.D and MADD.D.

An exemplary instruction sequence using the paired-single format (format PS) for RSQRT1 605, RSQRT2 606, MADD 801 and MUL 901 is provided below. The example illustrates the use of the paired-single FP version of RSQRT1, RSQRT2, MADD and MUL to produce a full precision paired-single FP reciprocal of a paired-single FP value. In this embodiment, the underlying hardware includes two 128-word lookup tables (for RSQRT1.PS) configured in conventional SIMD architecture to process both reduced precision operations concurrently. In an alternate embodiment, the reduced precision operations can be processed sequentially using a single lookup table. Values "a" and "b" are assumed to be two single FP values in the paired-single format in register f0.

| | | |
|---|---|---|
| RSQRT1.PS | f1, f0 | [approximately 15-bit 1/sqrt(a) and 1/sqrt(b)] |
| MUL.PS | f2, f1, f0 | [f0 * f1] |
| RSQRT2.PS | f3, f2, f1 | [−(f1 * f2 − 1.0)/2] |
| MADD.PS | f4, f1, f1, f3 | [24-bit 1/sqrt(a) and 1/sqrt(b)] |

An exemplary instruction sequence using the single FP format for RSQRT1 605 and the paired-single format for RSQRT2 606, MADD 801 and MUL 901 is provided below. The example illustrates the use of the single FP version of RSQRT1 and the paired-single version of RSQRT2, MADD and MUL to produce a paired-single FP reciprocal of two single FP values. Values "a" and "b" are assumed to be two single FP values in registers f0 and f1, respectively.

| | | |
|---|---|---|
| RSQRT1.S | f2, f0 | [f2 gets reduced precision 1/sqrt(a)] |
| RSQRT1.S | f3, f1 | [f3 gets reduced precision 1/sqrt(b)] |
| CVT.PS.S | f4, f1, f0 | [f4 holds PS values b\|a] |
| CVT.PS.S | f5, f3, f2 | [f5 holds PS seed 1/sqrt(b)\|1/sqrt(a)] |
| MUL.PS | f6, f5, f4 | [f6 holds intermediate1 results] |
| RSQRT2.PS | f7, f6, f5 | [f7 holds intermediate2 results] |
| MADD.PS | f8, f5, f5, f7 | [f8 holds full precision PS 1/sqrt(b)\|1/sqrt(a)] |

In accordance with the present embodiment of the present invention, the ADDR, MULR, RECIP1, RECIP2, RSQRT1 and RSQRT2 instructions are added to ASE 350 (FIG. 3). The instructions implement functionality that efficiently perform calculations which may be used in a variety of applications including geometric transformations, perspective divide, normalization, renormalization, and lighting calculations used in computer-generated graphics design. These instructions can be used on a general purpose processor. As described above, these instructions can be used with the paired-single data format as well as other data formats. Consequently, the ADDR, MULR, RECIP1, RECIP2, RSQRT1 and RSQRT2 instructions eliminate processing steps associated with one or more convert instructions that would be otherwise required to convert data from one format to another. The ADDR and MULR instructions also eliminate processing steps to operate on paired-single values that were formerly required in order to achieve the same result provided by ADDR and MULR.

Geometry ASE—Compare and Format Conversion Instructions

Refer now to FIGS. 6G, 6H and 6I which each illustrate one of three compare or format conversion instructions included within geometry ASE 350 in accordance with one embodiment of the present invention. The compare instruction is designated as CABS 607, and the format conversion instructions are designated as, respectively, CVT.PW.PS 608 and CVT.PS.PW 609. In each of these instructions, an operation code (e.g., COP1 together with a specified instruction such as CABS) is used to instruct the processor of the specific action to be performed. Each instruction also specifies the input data (or the location of the input data) in fields "fs" and "ft," the destination location of the data resulting from the application of the operation specified by the instruction in field "fd," and the format of the input data in field "fmt;" formats include paired-single ("PS"), single precision ("single" or "S"), and double precision ("double" or "D"). In the present embodiment, each instruction is 32 bits in length. FIGS. 6G through 6I provide exemplary instruction formats for a variety of data formats (see "Format" in each Figure).

CABS

With reference to FIG. 6G, CABS 607 (referred to herein as a "compare," "magnitude compare," or "absolute compare" instruction) is used to compare floating point (FP) absolute values and record the boolean result in one or more condition codes. In a preferred embodiment, CABS 607 is executed in a single clock cycle and is designed to work in a paired-single format; however, it is appreciated that in other embodiments, other data formats such as a single or double FP format can be used. The double FP format uses twice the number of bits as the single FP format, and hence is used to obtain more bits of precision when storing and manipulating data. An operation that can operate using a double FP format thus preserves the higher precision of the data. The paired-single format is described above in conjunction with FIG. 5.

Continuing with reference to FIG. 6G, CABS 607 takes two input values specified by the instruction and compares their absolute values using the compare condition specified in the instruction. The instruction specifies two values, ft and fs, in the floating point register set whose contents are to be used as the input data to this operation. The instruction also specifies a compare condition with a 4-bit condition sequence held in the "cond" field 630. In the present embodiment, the compare conditions used and associated condition sequences (i.e., 0 through 15) are listed in Table 2. It is appreciated that other compare conditions can be used in accordance with the present invention.

TABLE 2

Exemplary Compare Conditions and Codes

| MNEMONIC | DEFINITION | MNEMONIC | DEFINITION | CONDITION SEQUENCE |
|---|---|---|---|---|
| T | True | F | False | 0 |
| OR | Ordered | UN | Unordered | 1 |
| NEQ | Not Equal | EQ | Equal | 2 |
| OLG | Ordered or Less Than or Greater Than | UEQ | Unordered or Equal | 3 |
| UGE | Unordered or Greater Than or Equal | OLT | Ordered Less Than | 4 |
| OGE | Ordered Greater Than | ULT | Unordered or Less Than | 5 |
| UGT | Unordered or Greater Than | OLE | Ordered Less Than or Equal | 6 |

TABLE 2-continued

Exemplary Compare Conditions and Codes

| MNEMONIC | DEFINITION | MNEMONIC | DEFINITION | CONDITION SEQUENCE |
|---|---|---|---|---|
| OGT | Ordered Greater Than | ULE | Unordered or Less Than or Equal | 7 |
| ST | Signaling True | SF | Signaling False | 8 |
| GLE | Greater Than, or Less Than or Equal | NGLE | Not Greater Than or Less Than or Equal | 9 |
| SNE | Signaling Not Equal | SEQ | Signaling Equal | 10 |
| GL | Greater Than or Less Than | NGL | Not Greater Than or Less Than | 11 |
| NLT | Not Less Than | LT | Less Than | 12 |
| GE | Greater Than or Equal | NGE | Not Greater Than or Equal | 13 |
| NLE | Not Less Than or Equal | LE | Less Than or Equal | 14 |
| GT | Greater Than | NGT | Not Greater Than | 15 |

CABS 607 checks to see how the absolute value of the data value in the fs register compares to the absolute value of the data value in the ft register. By comparing the absolute values (i.e., magnitudes) instead of comparing the actual values including the sign, the present invention reduces the number of comparisons by one-half, resulting in a commensurate increase in processing speed. For example, instead of performing the following two comparisons:

$x' \leq w'$ and $x' \geq -w'$;

the present invention need only perform the single comparison:

$|x'| \leq |w'|$.

In the present embodiment, the condition codes resulting from the comparison are written into FCSR 410 (FIG. 4) (or, in an alternative embodiment, in a dedicated floating point condition code register, FPCCR) in the bit location specified by the "cc" field 635 in the instruction.

In one embodiment, the single and double FP formats generate one bit of boolean result, and a single condition code bit is written. The paired-single FP format generates two conditional indicators, one for each of the single values in the pair, and two consecutive condition code bits are written. In that case, the value in the cc field is aligned to a value of two.

For single, double, and paired-single formats, CABS 607 is represented as the following, respectively:

```
cc <- |fs.S|compare_cond|ft.S|;
cc <- |fs.D|compare_cond|ft.D|;
cc_{n+1} <- |fs.PU|compare_cond|ft.PU|; and
cc_n <- |fs.PL|compare_cond|ft.PL|
```

The symbol "<-" is used to indicate that the value to the right of the symbol is assigned to a location indicated to the left of the symbol; "PL" indicates the lower value in the paired-single datatype format; and "PU" indicates the upper value in the paired-single datatype format. If the comparison specified by "compare_cond" is true for the operand values, the result is true (represented by a logic 1); otherwise, the result is false (represented by a logic 0). If no exception is taken, the result is written into the bit location(s) (specified by the instruction) of the condition code field (fcc) in FCSR 410. In this embodiment, false is designated by a logic zero (0) and true is designated by a logic one (1); however, it is understood that other designations may be used to designate true and false in accordance with the present invention.

The sequence of operations that describe the CABS 607 instruction is:
   Read FPR[fs]
   Read FPR[ft]
   Absolute Compare |FPR[fs]| cond |FPR[ft]|
   Write condition indicator(s) to FCC[cc]

It is appreciated that CABS 607 can be used with data set formats other than the paired-single format. It is further appreciated that the instructions can be extended to formats other than the paired-single format such as the quad-single or octal-single formats. In another embodiment, the data set format could comprise more than two single-precision floating point numbers. Similarly, in another embodiment more than two registers can be used. For example, the data set format could comprise four single-precision floating point values.

The CABS 607 instruction is processed by adder 284 of FPU 270 in the following manner. Initially, the sign bit of each operand is forced to zero (such as by logically ANDing each sign bit with a zero value). The resulting operands are then subtracted and the difference is processed according to a conventional compare operation. When handling paired-single data types (i.e., CABS.PS), the two paired-single operands are processed in parallel using the two single precision datapaths of adder 284.

CVT.PW.PS

With reference now to FIG. 6H, CVT.PW.PS 608 is used to convert a FP paired-single value to a pair of fixed point integers. In the present embodiment, the fixed point integers are 32 bits in length. CVT.PW.PS 608 is represented as:
   fd.PU<-convert_and_round(fs.PU);
   fd.PL<-convert_and_round(fs.PL).

CVT.PW.PS 608 converts the two FP values in the paired-single format in fs to a pair of 32-bit fixed point integer values, and puts them in the corresponding high and low 32 bits of the FP register fd. Rounding is according to the rounding mode specified in FCSR (e.g., FCSR 410 FIG. 4). Such rounding modes are well known to those having ordinary skill in the art.

It is appreciated that CVT.PW.PS 608 can be extended to data set formats other than the paired-single format, such as the quad-single format or the octal-single format.

When the source value is infinity, NaN (not a number), or rounded to an integer outside the range $-2^{31}$ to $2^{31}-1$, the result cannot be correctly represented and an IEEE invalid operation exists. The result would depend on the floating point exception model currently active in the processor.

In another embodiment, the data set format could instead comprise more than two single-precision floating point numbers; for example, it could comprise four single precision floating point values held in two registers. Similarly, in another embodiment more than two registers can be used with a corresponding change to the instruction format (to specify each of the input registers).

CVT.PS.PW

With reference to FIG. 6I, CVT.PS.PW 609 is used to convert a pair of fixed point integers to a FP paired-single value. In the present embodiment, the fixed point integers are 32 bits in length. CVT.PS.PW 609 is represented as:

fd<-convert_and_round($fs_{63\ldots32}$)||convert_and_round ($fs_{31\ldots0}$);

where the symbol "||" is used to indicate bit string concatenation. CVT.PS.PW 609 converts the two 32-bit fixed point integers in fs to a paired-single format and places the result into the FP register fd. Rounding is according to the rounding mode specified in FCSR 410. As noted above, such rounding modes are well known to those having ordinary skill in the art.

It is appreciated that CVT.PS.PW 609 can be extended to data set formats other than the paired-single format, such as the quad-single format or the octal-single format.

In another embodiment, the data set format could instead comprise more than two single-precision floating point numbers; for example, it could comprise four single precision floating point values held in two registers. Similarly, in another embodiment more than two registers can be used with a corresponding change to the instruction format (to specify each of the input registers).

In accordance with the present embodiment of the present invention, the CABS, CVT.PW.PS and CVT.PS.PW instructions are added to geometry ASE 350 (FIG. 3). The CVT.PW.PS and CVT.PS.PW instructions are designed to work in the paired-single format. These instructions enable the use of the paired-single format with fixed point integers, which enables two simultaneous operations on a pair of operands and thus improves the performance of the geometry engine. The CABS instruction can be used with a variety of formats including single precision, double precision, and paired-single data formats. The instructions implement functionality that efficiently perform operations that may be used in a variety of applications including computer-generated graphics design. In particular, a clipping operation (used in a three-dimensional geometry operation) may be accelerated with the CABS instruction. These instructions can be used on a general purpose processor.

Geometry ASE—Conditional Branch Instructions

Refer now to FIGS. 6J, 6K, 6L and 6M which each illustrate one of four conditional branch instructions included within geometry ASE 350 in accordance with one embodiment of the present invention. The conditional branch instructions are designated as, respectively, BC1ANY2F 610, BC1ANY2T 611, BC1ANY4F 612, and BC1ANY4T 613. In each of these instructions, an operation code (e.g., COP1 together with a specified instruction such as BC1ANY4T) is used to instruct the processor of the specific action to be performed. Additionally, an indicator bit 620 is used to specify whether the test for a given branch operation is to be based on a "true" or "false" state of condition code bits (described below).

In the embodiments discussed below, false is designated by a 0 and true is designated by a 1; however, it is understood that other designations may be used for true and false in accordance with the present invention.

It is understood that some computer system architectures delay the effects of a branch operation by one instruction (e.g., a branch delay slot).

BC1ANY2F

With reference to FIG. 6J, BC1ANY2F 610 looks at two specified condition code bits (e.g., $CC_n$ and $CC_{n+1}$) disposed, for example, within the fcc field of FCSR 410 (FIG. 4). If either of them are set to a pre-determined state (e.g., false), a branch target address is computed and the execution branches to the computed branch target. That is, if $CC_{n+1}=0$ or $CC_n=0$, then branch. In one embodiment, the condition code bit is compared to an indicator bit (e.g., tf 620) to determine if the condition code bit is set to the pre-determined state. It is appreciated that two consecutive condition code bits are represented in this embodiment, but that other embodiments in which the condition codes are not consecutive may be used in accordance with the present invention.

In the present embodiment, an 18-bit signed offset (the 16-bit offset field shifted left two bits) is added to the address of the instruction following the branch (not the branch itself) in the branch delay slot to form a program counter (PC) relative effective target address. If either one of the two floating point (FP) condition code bits (CC) is false, the program branches to the effective target address after the instruction in the delay slot is executed.

In the present embodiment, the CC specified aligns to two, so bit 18 is set to zero.

For example, specifying a value of four will check if either one of $CC_5$ or $CC_4$ is 0 and branch accordingly.

As described above, a FP condition code can be set by a FP compare instruction (e.g., CABS 607 of FIG. 6G) when used to compare the magnitude of floating point numbers.

BC1ANY2T

Figure 6K:
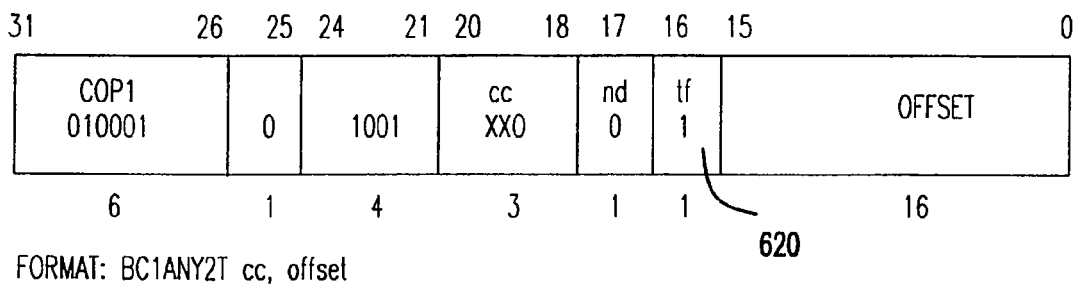

With reference to FIG. 6K, BC1ANY2T 611 looks at two specified condition code bits (e.g., $CC_n$ and $CC_{n+1}$) disposed, for example, within the fcc field of FCSR 410. If either of them are true, a branch target address is computed and the execution branches to the computed branch target. That is, if $CC_{n+1}=1$ or $CC_n=1$, then branch. In one embodiment, the condition code bit is compared to an indicator bit (e.g., tf 620) to determine if the condition code bit is set to the pre-determined state. It is appreciated that two consecutive condition code bits are represented in this embodiment, but that other embodiments in which the condition codes are not consecutive may be used in accordance with the present invention.

In the present embodiment, an 18-bit signed offset (the 16-bit offset field shifted left two bits) is added to the address of the instruction following the branch (not the branch itself) in the branch delay slot to form a PC-relative effective target address. If either one of the two FP condition code bits (CC) is true (logic 1), the program branches to the effective target address after the instruction in the delay slot is executed.

In the present embodiment, the CC specified aligns to two, so bit 18 is set to zero. For example, specifying a value of two will check if either one of $CC_3$ or $CC_2$ is one and branch accordingly.

BC1ANY4F

Figure 6L:
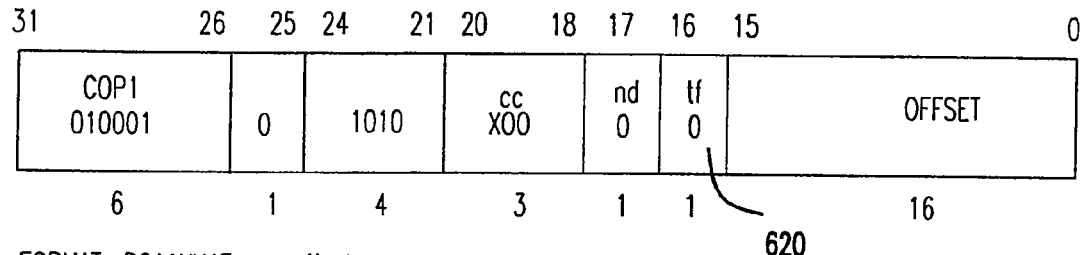

With reference to FIG. 6L, BC1ANY4F 612 looks at four specified condition code bits (e.g., $CC_n$, $CC_{n+1}$, $CC_{n+2}$, and $CC_{n+3}$) disposed, for example, within the fcc field of FCSR 410. If any of them are false, a branch target address is computed and the execution branches to the computed branch target. That is, if $CC_{n+3}=0$ or $CC_{n+2}=0$ or $CC_{n+1}=0$ or $CC_n=0$, then branch. In one embodiment, the condition code bit is compared to an indicator bit (e.g., tf 620) to determine if the condition code bit is set to the pre-determined state. It is appreciated that four consecutive condition code bits are represented in this embodiment, but that other embodiments in which the condition codes are not consecutive may be used in accordance with the present invention.

In other embodiments, instead of branching if any one of the condition code bits are false, branching occurs based on a specified combination of condition code bit values. For example, branching can be specified to occur if $CC_{n+3}=0$ and $CC_{n+2}=0$. That is, in accordance with the present invention, a combination of "and's" and "or's" can be used to specify branching as a function of any combination of condition code bits (i.e., any combination of 1's and 0's). It is appreciated that this can be implemented using various methods known in the art, such as a programmable logic array.

In the present embodiment, an 18-bit signed offset (the 16-bit offset field shifted left two bits) is added to the address of the instruction following the branch (not the branch itself) in the branch delay slot to form a PC-relative effective target address. If any of the four FP condition code bits CC is false (logic 0), the program branches to the effective target address after the instruction in the delay slot is executed.

In the present embodiment, the CC aligns to four, so bits 18 and 19 are set to zero. For example, specifying a value of zero will check if any of the bits $CC_{3...0}$ is zero and branch accordingly.

BC1ANY4T

Figure 6M:
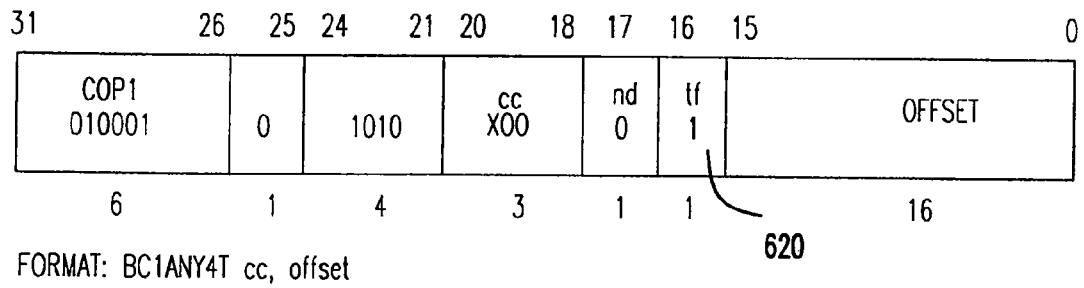

With reference to FIG. 6M, BC1ANY4T 613 looks at four specified condition code bits (e.g., $CC_n$, $CC_{n+1}$, $CC_{n+2}$, and $CC_{n+3}$) disposed, for example, within the fcc field of FCSR 410. If any of them are true, a branch target address is computed and the execution branches to the computed branch target. That is, if $CC_{n+3}=1$ or $CC_{n+2}=1$ or $CC_{n+1}=1$ or $CC_n=1$, then branch. In one embodiment, the condition code bit is compared to an indicator bit (e.g., tf 620) to determine if the condition code bit is set to the pre-determined state. It is appreciated that four consecutive condition code bits are represented in this embodiment, but that other embodiments in which the condition codes are not consecutive may be used in accordance with the present invention.

In other embodiments, instead of branching if any one of the condition code bits are true, branching occurs based on a specified combination of condition code bit values. For example, branching can be specified to occur if $CC_{n+3}=1$ and $CC_{n+2}=1$. That is, in accordance with the present invention, a combination of "and's" and "or's" can be used to specify branching as a function of any combination of condition code bits (i.e., any combination of 1's and 0's). It is appreciated that this can be implemented using various methods known in the art, such as a programmable logic array.

In the present embodiment, an 18-bit signed offset (the 16-bit offset field shifted left two bits) is added to the address of the instruction following the branch (not the branch itself) in the branch delay slot to form a PC-relative effective target address. If any of the four FP condition code bits CC is true (logic 1), the program branches to the effective target address after the instruction in the delay slot is executed.

In the present embodiment, the CC aligns to four, so bits 18 and 19 are set to zero. For example, specifying a value of four will check if any the bits $CC_{7...4}$ is zero and branch accordingly.

In accordance with the present embodiment of the present invention, the BC1ANY2F, BC1ANY2T, BC1ANY4F, and BC1ANY4T instructions are added to ISA 320 (FIG. 3). BC1ANY2F and BC1ANY2T each look at two specified condition code bits, and BC1ANY4F and BC1ANY4T each look at four specified condition code bits; however, it is appreciated that other embodiments of the conditional branch instructions can look at different numbers of condition code bits (e.g., three, or more than four) in accordance with the present invention. Based upon the state of one or more condition code bits (i.e., the condition code state), a branch may occur in accordance with the present invention.

For each of the BC1ANYxx instructions (where xx=2F, 2T, 4F and 4T) identified above, an embodiment is described where a condition code bit is compared to an indicator bit (i.e., bit 620) within each instruction. The result of this comparison determines whether the condition code bit is set to a predetermined state. In an alternative (and preferred) embodiment, the condition code bits associated with a particular branch instruction (e.g., the four bits associated with BC1ANY4T) are initially combined through circuitry (e.g., a state machine, programmable logic array, combinatorial logic, etc.) to produce a single, combined bit. This bit is then compared to the indicator bit of the subject instruction to determine whether the subject branch condition is met (e.g., whether any one of the combined condition code bits is set to the pre-determined state). This circuitry, for example, may function as a logical OR or AND gate to determine whether any one of a plurality of bits is set (logical 1) or reset (logical 0), respectively. In an alternative embodiment, such circuitry may represent more complex boolean equations, for example, requiring a specific combinations of logical 1's and 0's from the subject condition code bits before allowing a branch to occur.

In accordance with the present invention, the conditional branch instructions use a single branch instruction to process a plurality of condition code bits. Thus, sequential branches are eliminated and consequently the number of instructions can be reduced. Hence, the conditional branch instructions implement functionality that efficiently perform operations that may be used in a variety of applications including computer-generated graphics design. In particular, a clipping operation (used in a three-dimensional geometry operation) may be accelerated with the foregoing branch instructions. These instructions can be used on a general purpose processor.

Floating Point Multiply/Add (MADD)

Refer now to FIG. 8, which illustrates the floating point multiply/add instruction MADD 801. MADD 801 performs a combined multiply, then add operation on floating point values. The instruction is represented as:

fd<-(fs×ft)+fr;

where "fd" is the index specifying the destination register, and "fs,", "ft," and "fr" are indices specifying three registers in the floating point register set whose contents are to be used as input data for the operation.

With reference still to FIG. 8, the value in fs is multiplied by the value in ft to produce a product. The value in fr is added to the product. In the present embodiment, the resulting sum is calculated to infinite precision, rounded according to the current rounding mode specified in the FCSR (e.g., FCSR 410 of FIG. 4), and placed into fd. MADD 801 supports the single, double and paired-single formats. The field "fmt" specifies the format of the operands and the result.

Floating Point Multiply (MUL)

Refer now to FIG. 9, which illustrates the floating point multiply instruction MUL 901. MUL 901 is used to multiply floating point values. The instruction is represented as:

fd<-fs×ft;

where "fd" is the index specifying the destination register, and "fs" and "ft" are indices specifying two registers in the floating point register set whose contents are to be used as input data for the operation.

With reference still to FIG. 9, the value in fs is multiplied by the value in ft to produce a product. In the present embodiment, the product is calculated to infinite precision, rounded according to the current rounding mode specified in the FCSR (e.g., FCSR 410 of FIG. 4), and placed into fd. MUL 901 supports the single, double and paired-single formats. The field "fmt" specifies the format of the operands and the result.

In accordance with the foregoing discussion, output generated by instructions identified above (e.g., ADDR, MULR, RECIP1, RECIP2, RSQRT1, RSQRT2, CVT, MUL and MADD) may be formatted in any number of ways, including paired single, paired double, quad single, quad double, etc. In an alternative embodiment, these instructions may be configured to input a single operand (e.g., S-type operand) or vector-type operand (e.g., a PS-type operand) and duplicate results to output a newly-generated vector operand (e.g., PS operand) or a larger vector operand (e.g., a quad-single operand), respectively. For example, an instruction may be configured to process an S-type input to produce an S-type result, and then duplicate this result to produce a PS-type output (i.e., the lower half of a doubleword is duplicated into its upper half to produce the PS-type format). This alternative embodiment could be particularly useful in RECIP 1 and RSQRT1 instructions.

Exemplary Process for Geometry Calculations Using World Coordinates

Figure 11A:
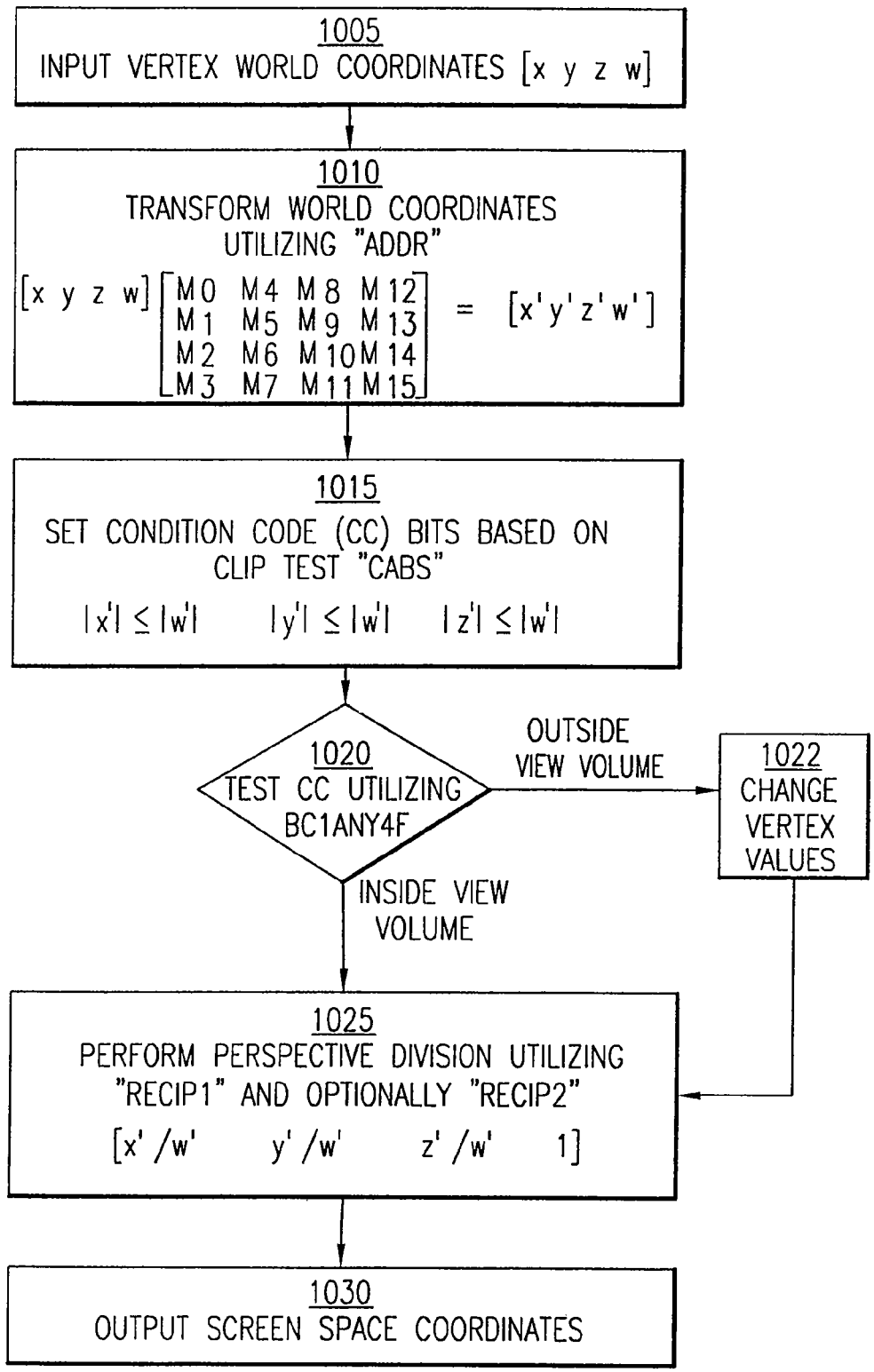
FIG. 11A is a flowchart of an exemplary process showing steps that use the instruction set architecture of FIG. 3 for geometry transformation calculations using world coordinates in accordance with one embodiment of the present invention.

Refer now to FIG. 11A, which is a flowchart of an exemplary process 1000 showing steps that use the instruction set architecture of FIG. 3 for geometry calculations using world coordinates in accordance with one embodiment of the present invention. Process 1000 is implemented using an instruction set architecture in accordance with the present embodiment and executed, for example, by processor 102b (FIG. 2B). Process 1000 is used in the geometry portion of a graphics pipeline.

In step 1005 of FIG. 11A, using known techniques, the graphics image is framed using points, lines and geometric shapes referred to as "primitives," and world coordinates [x y z w] are derived for the vertices of the primitives. World coordinates are preferably in the PS format, but may also be in the single or double format.

In step 1010, in the present embodiment, the world coordinates [x y z w] are transformed to [x' y' z' w'] by a four-by-four floating point matrix using the paired-single format of instructions MUL, MADD, ADDR and LD (load doubleword). An annotated listing of the instruction sequence used to carry out this transformation is provided in FIG. 12. Transformation includes rotations, translations, scalings along the coordinate axes, perspective transformation, and combinations of these.

In step 1015 of FIG. 11A, the clip test is performed to determine which primitives, or parts of primitives, will appear in the displayed graphics image (that is, they fit within the specified view volume). The clip test can be performed using the CABS 607 instruction (FIG. 6G). The CABS 607 instruction is used to compare the absolute value of the transformed coordinates of each vertex (e.g., the absolute values of ±x', ±y', ±z') against the absolute value of the standard viewing planes (e.g., the absolute value of ±w'). In accordance with the present embodiment, in the paired-single format, CABS 607 provides the capability for testing up to four view volume edges in one clock cycle.

Specifically, in a paired-single format CABS 607 can compare a first data set holding, for example, |x| and |y| values (representing x' and y' transformed coordinates) with a second data set holding |w| and |w| values (representing viewing planes or, more specifically, two view volume edges of a three-dimensional volume). As noted above, a single magnitude compare (e.g., |x|<=|w|) can replace the conventional two-step inequality evaluation of x<=w and x≧-w (which may be used to test view volume edges). Hence, if the magnitude of x is less than or equal to the magnitude of w, then x fits within the subject view volume. The same test applies to y.

Referring to Table 2, a condition sequence of 14 (i.e., "LE" or less than or equal) may be disposed within cond field 630 of CABS 607 (FIG. 6G) to effect the desired condition. By applying this test to the operands as described above, four view volume edges (i.e., +/-x and +/-y compared against +/-w) are compared with a single CABS.PS instruction.

Six view volume edges are typically tested to determine whether a primitive fits within a three-dimensional view volume (i.e., two for each of coordinates x, y and z). Hence, a second CABS 607 instruction can be executed to test the "z" coordinate in the present example (i.e., to determine if the magnitude of z is less than or equal to w). If tests for x, y and z are all true, no clipping is required. However, if one or more (but not all) coordinates are outside the viewing volume, a clipping operation should be performed. Therefore, as shown in the pseudocode of Table 3 (below), branching to a clipping operation should occur in this example if any one of the subject condition codes are set false (i.e., the "LE" condition is not satisfied for at least one coordinate).

In another embodiment, in the single or double FP format, CABS 607 can test two view volume edges in one clock cycle (e.g., a single datum representing the magnitude of coordinate x, y or z is compared to another datum representing the magnitude of edge w). In yet another embodiment, in the quad-single data format, CABS 607 can provide the capability for testing up to eight view volume edges in one clock cycle. As described above, CABS 607 sets condition codes based upon the results of such comparisons.

In step 1020 of FIG. 11A, a conditional branch instruction BC1ANY4F 612 of FIG. 6L is preferably used to branch to the appropriate branch target based on the condition codes from step 1015. The primitives that fit within the specified view volume are accepted and their coordinates are passed on to step 1025. Those primitives that do not fit with the specified view volume are eliminated. Those primitives that are only partially within the view volume need to be clipped to remove the portion lying outside the view volume.

Pseudocode that exemplifies the operations of steps 1015 and 1020 is provided below in Table 3 (where "FP#" represents floating point registers). Nops are used in the pseudocode to prevent pipeline dependency stalls for a particular embodiment of a floating-point pipeline.

TABLE 3

Exemplary Pseudocode for Steps 1015 and 1020 of FIG. 11A

| ACTION | OPERATION | COMMENT |
|---|---|---|
| FP10 = y' ‖ x' | | ;step 1015 below<br>;from matrix transform in FIG. 12A |
| FP11 = w' ‖ z' | | ;same |
| FP29 = w' ‖ w' | PUU.PS FP29, FP11, FP11 | ;pair upper upper - form new paired-single value by concatenating the upper single of FP11 and FP11 |
| nop | | |
| nop | | |
| nop | | |
| clipcheck y' ‖ x' | CABS.LE.PS cc0, EP10, FP29 | ; \|x'\|≦\|w'\|, \|y'\|≦\|w'\| |
| clipcheck w' ‖ z' | CABS.LE.PS cc2, FP11, FP29 | ; \|z'\|≦\|w'\|, \|w'\|≦\|w'\| |
| nop | | |
| nop | | |
| nop | | ;step 1020 below |
| cond.branch | BC1ANY4F 0, [step 1022] | ;branch to step 1022 if any of condition codes (cc) 0 to 3 (in FCSR) are set false |

Referring to Table 3, as shown in the pseudocode, a single CABS instruction in paired-single format provides the testing of four view volume edges (i.e., +/−x, +/−y against +/−w) in a single operation. Since CABS is executed in a single clock cycle, all four view volume edges are compared in this single cycle.

The pseudocode of Table 3 illustrates an exemplary instruction sequence (including the CABS 607 and BC1ANY4F 612 instructions) for a clip test where clipping is deemed necessary only if a coordinate (e.g., x) exceeds a view volume edge (defined by w). Therefore, according to this embodiment, a coordinate that equals the value of an edge (i.e., effectively resting on top of the edge) is considered to be within the subject view volume. As would be apparent to those having ordinary skill in the art, the instructions described herein are flexible (see, e.g., Table 2 listing sixteen CABS condition sequences) and can support variations of this clip test, such as, for example, requiring clipping when a coordinate is greater than or equal to an edge value.

The nop (i.e., "no operation") instructions provided in Table 3 and below in Tables 4 and 5 are based upon a particular implementation of FPU 270 (FIG. 2C) and pipeline details. As would be understood by those with ordinary skill in the art, these instructions may increase or decrease in number and placement for other implementations.

In step 1022, the primitives that lie partially within the view volume are clipped and the resultant vertex values are determined using a known clip routine.

In step 1025, in order to project the three-dimensional coordinates into two dimensions, perspective division of the transformed coordinates is performed for those primitives that are within the view volume using RECIP1 603 (FIG. 6C) and, depending on the application, RECIP2 604 (FIG. 6D). In some applications, the reduced precision of RECIP1 603 is sufficient and RECIP2 604 is not used. In other applications, for example when more precision is desired, RECIP2 604 may also be used.

Pseudocode that exemplifies the operations of step 1025 is provided below in Table 4 in accordance with one embodiment.

TABLE 4

Exemplary Pseudocode for Step 1025 of FIG. 11A

| ACTION | OPERATION | COMMENT |
|---|---|---|
| recip1 w' ‖ w' | RECIP1.PS FP30, FP29 | ;step 1025<br>;start perspective divide |
| recip2 w' ‖ w' | RECIP2.PS FP31, FP30, FP29 | |
| FP05 = 1/w' ‖ 1/w' | MADD.PS FP05, FP30, FP30, FP31 | |
| nop | | |
| nop | | |
| nop | | |
| FP10 = y'/w' ‖ x'/w' | MUL.PS FP10, FP10, FP05 | ;FP10 value from Table 3 above |
| FP11 = w'/w' ‖ z'/w' | MUL.PS FP11, FP11, FP05 | ;FP11 value from Table 3 above<br>;complete perspective divide |

In step 1030, the coordinates for displaying the graphics image in two-dimensional screen space are output from process 1000 for use in subsequent stages of the graphics pipeline (e.g. rendering and rasterization).

Exemplary Process for Geometry Calculations Using Normal Coordinates

Figure 11B:
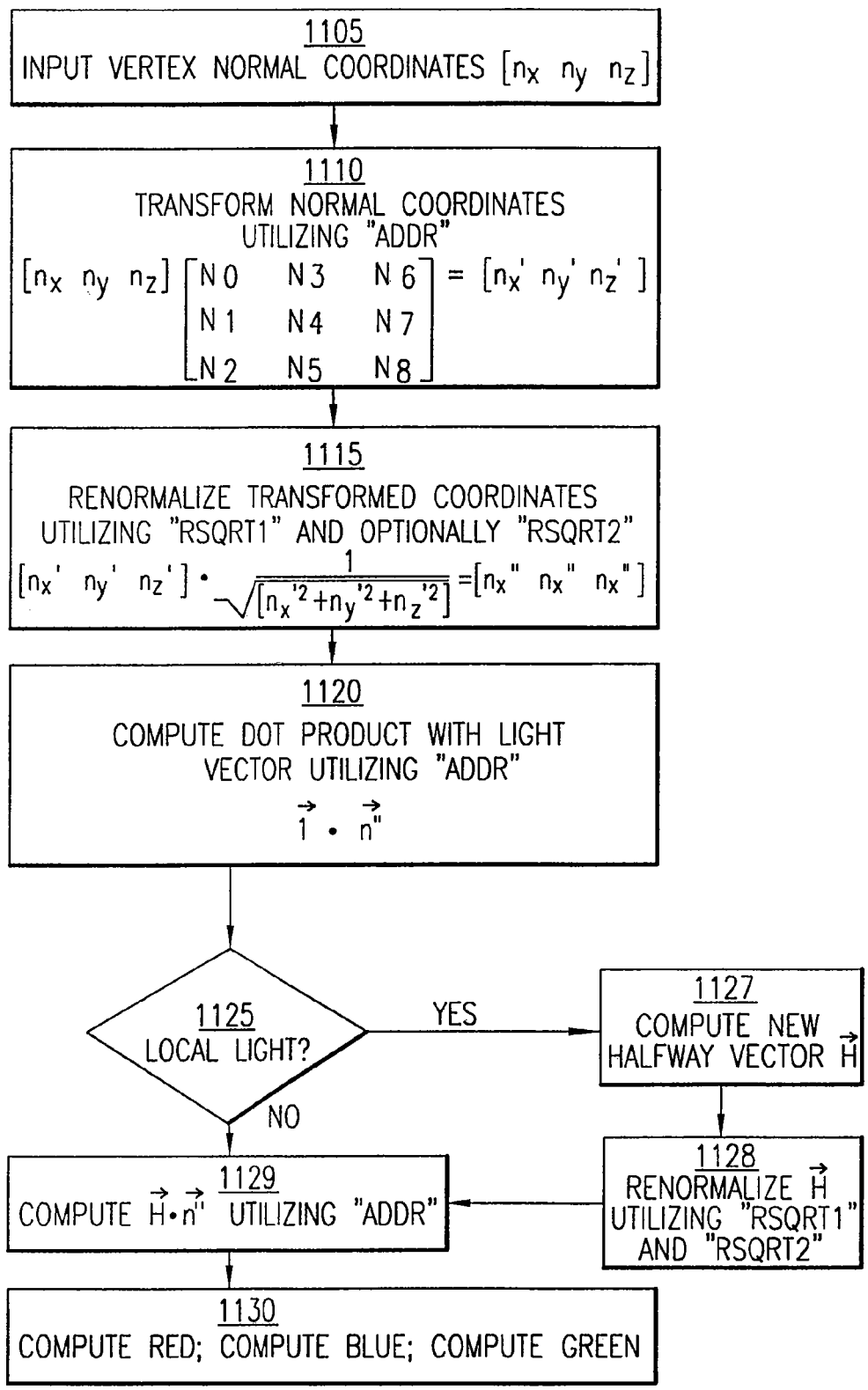
FIG. 11B is a flowchart of an exemplary process showing steps that use the instruction set architecture of FIG. 3 for geometry lighting calculations using surface normal coordinates in accordance with one embodiment of the present invention.

Refer now to FIG. 11B, which is a flowchart of an exemplary process 1100 showing steps that use the instruction set architecture of FIG. 3 for geometry calculations using surface normal coordinates in accordance with one embodiment of the present invention. Process 1100 is implemented using an instruction set architecture in accordance with the present embodiment and executed, for example, by processor 102*b* (FIG. 2B). Process 1100 is used in the geometry portion of a graphics pipeline.

In step 1105 of FIG. 11B, using known techniques, the graphics image data include surface normal coordinates [$n_x$ $n_y$ $n_z$].

In step 1110, in the present embodiment, the surface normal coordinates are transformed to [$n_x'$ $n_y'$ $n_z'$] by a three-by-three floating point matrix using paired-single format instructions MUL, MADD and ADDR in an operation analogous to that shown in FIG. 12A. Transformation includes rotations, translations, scalings along the coordinate axes, perspective transformation, and combinations of these.

In step 1115 of FIG. 11B, the transformed surface normal coordinates [$n_x'$ $n_y'$ $n_z'$] are renormalized to represent unit length vectors using the RSQRT1 605 instruction (FIG. 6E) and, depending on the application, the RSQRT2 606 instruction (FIG. 6F). In some applications, the reduced precision of RSQRT1 605 is sufficient and RSQRT2 606 is not used. In other applications, for example when more color component precision is desired, RSQRT2 606 is also used.

Pseudocode that exemplifies the operations of step 1115 at the level of RSQRT1 only is provided below in Table 5.

TABLE 5

Exemplary Pseudocode for Step 1115 of FIG. 11B

| ACTION | OPERATION | COMMENT |
|---|---|---|
| nop | | ;step 1115 |
| FP20 = ny' ∥ nx' | | ;normal coordinates ny' and nx' held in paired-single format in register 20 |
| FP21 = nz' ∥ nz' | | ;normal coordinate nz' held in paired-single format in register 21 |
| nop | | ;begin to renormalize |
| FP22 = sq(ny') ∥ sq(nx') | MUL.PS FP22, FP20, FP20 | |
| nop | | |
| nop | | |
| nop | | |
| FP22 = sq(ny') + sq(nx') ∥ sq(ny') + sq(nx') | ADDR.PS FP22, FP22, FP22 | |
| nop | | |
| nop | | |
| nop | | |
| FP22 = sq(nz') + sq(ny') + sq(nx') ∥ sq(nz') + sq(ny') + sq(nx') | MADD.PS FP22, FP22, FP21, FP21 | |
| nop | | |
| nop | | |
| FP22 = inverse sqrt sq(nz') + sq(ny') . . . | RSQRT1.PS FP22, FP22 | ;get inverse sqrt |
| nop | | ;14-bit accuracy |
| nop | | |
| FP20 = ny" ∥ nx" | MUL.PS FP20, FP20, FP22 | ;renormalized |
| FP21 = nz" ∥ nz" | MUL.PS FP21, | ; |

In step 1120 of FIG. 11B, the dot product of the vector "l" (which defines the direction to the light source) and the renormalized coordinates [$n_x"$ $n_y"$ $n_z"$] is determined using ADDR 601 of FIG. 6A. This dot product is used in a known manner in lighting calculations.

In step 1125, if local lighting is to be considered, process 1100 branches to step 1127. If local lighting is not to be considered, process 1100 proceeds directly to step 1129 to use a previously computed halfway vector "H" (not shown) in a dot product calculation.

In step 1127, a new halfway vector "H" is computed. The halfway vector is used in a known manner in lighting calculations.

In step 1128, the halfway vector is renormalized to unit length using the RSQRT1 605 instruction (FIG. 6E) and, depending on the application and the desired amount of precision, the RSQRT2 606 instruction (FIG. 6F).

In step 1129, the dot product of the new or previously computed halfway vector and the renormalized coordinates [$n_x"$ $n_y"$ $n_z"$] is determined using ADDR 601 of FIG. 6A. This dot product is used in a known manner in lighting calculations (e.g., for shininess).

In step 1130, the colors (red, green, blue) of the vertices are computed in a known manner, and the results are output from process 1100 for use in subsequent stages of the graphics pipeline (e.g., rendering and rasterization).

In summary, an embodiment of the present invention can speed up of the geometry processing in computer-generated graphics design by reducing the total number of instructions needed in a processor. This embodiment provides an instruction set that can efficiently perform complex calculations required for computer-generated graphics as well as other applications. The processor is therefore capable of performing calculations at speeds approaching the speed of the rasterization engine, so that the processor is less likely to become a bottleneck in the graphics pipeline.

In accordance with a preferred embodiment of the present invention, a geometry application specific extension to an instruction set architecture is provided that comprises floating point instructions executed by a general purpose processor (e.g., processor 102*b* of FIG. 2B), and hence accomplishes the above without the need for costly or dedicated hardware designs. This embodiment is designed to work with a paired-single floating point data set format as well as other floating point data set formats such as single precision, double precision, quad-single, and octal-single. In accordance with the preferred embodiment, an instruction set is provided that can be used on a general purpose processor and is powerful enough to perform the complex calculations required for computer-generated graphics. It would be understood by those with ordinary skill in the art that dedicated processors (for graphics and other applications) may also be configured to execute all or part of the instructions making up the application specific extension described above.

In an alternative embodiment, the application specific extension to an instruction set architecture described herein may be implemented in a computer program product that includes a computer readable and/or useable medium (e.g., CD-ROM, DVD, floppy disk, tape, DRAM, etc.) having all or some of the extension stored thereon as, for example, software. This software may be executed in any manner including running it on general purpose processors, dedicated processors, main frames, supercomputers, and so on.

The preferred embodiment of the present invention, a general purpose processor having an application specific extension of a general purpose instruction set architecture, is thus described. While the present invention has been described in particular embodiments, it should be appreciated that the present invention should not be construed as limited by such embodiments, but rather construed according to the following claims.

What is claimed is:

1. A processor that implements instructions belonging to a geometry application specific extension to an instruction set architecture, the processor comprising:

a status register that stores a plurality of condition code bits relating to a plurality of view volumes in response to a single compare instruction, wherein execution of a branch instruction following the single compare instruction causes the processor to start executing instructions fetched from a target address if one of two consecutive condition code bits specified by the branch instruction is equal to zero.

2. The processor of claim 1, wherein the two consecutive condition code bits are implicitly specified by the branch instruction.

3. In a processor, a method for performing computer graphics calculations comprising:

comparing the absolute value of a first number stored in a first floating point register and the absolute value of a second number stored in a second floating point register;

setting one or more of a plurality of condition code bits of the status register based on the comparing;

setting a first condition code bit of the plurality of condition code bits;

setting a second condition code bit of the plurality of condition code bits;

setting a third condition code bit of the plurality of condition code bits;

setting a fourth condition code bit of the plurality of condition code bits; and jumping to a branch target address and executing an instruction at the branch target address when any of the first condition code bit, the second condition code bit, the third condition code bit, or the fourth condition code bit is set to a pre-determined state.

4. In a processor, a method for performing computer graphics calculations comprising:

comparing the absolute value of a first number stored in a first floating point register and the absolute value of a second number stored in a second floating point register;

setting one or more of a plurality of condition code bits of the status register based on the comparing; and using a branch instruction to cause a processor to start executing instructions fetched from a target address when one of two consecutive condition code bits specified by the branch instruction is equal to zero.

5. In a processor, a method for performing computer graphics calculations comprising:

comparing the absolute value of a first number stored in a first floating point register and the absolute value of a second number stored in a second floating point register;

setting one or more of a plurality of condition code bits of the status register based on the comparing;

adding an offset to an address of an instruction in a branch delay slot to form a target address;

executing the instruction in the delay slot; and branching to a target address after execution of the instruction in the delay slot.

6. A processor that implements instructions belonging to a geometry application specific extension to an instruction set architecture, the processor comprising:

a plurality of floating point registers; and a status register that stores a plurality of condition codes, wherein execution of a compare instruction compares the absolute value of a first number stored in a first floating point register and the absolute value of a second number stored in a second floating point register and sets one or more of the plurality of condition codes of the status register based on condition sequence bits of the compare instruction, wherein execution of the compare instruction causes a sign bit of the first number and a sign bit of the second number to be zero.

7. The processor of claim 6, wherein execution of a branch instruction causes the processor to start executing instructions fetched from a target address if one of two consecutive condition code bits specified by the branch instruction is equal to zero.

8. The processor of claim 7, wherein one of the two consecutive condition code bits is implicitly specified by the branch instruction.

9. The processor of claim 6, wherein a conditional branch instruction is executed based on one of the plurality of condition codes of the status register.

10. The processor of claim 6, wherein execution of a branch instruction causes the processor to start executing instructions fetched from a target address when any of the plurality of condition codes of the status register is set to a pre-determined state.

11. The processor of claim 6, wherein a first condition code bit of the plurality of condition codes and a second condition code bit of the plurality of condition codes are compared to an indicator bit in a conditional branch instruction to determine if the first condition code bit or the second condition code bit is set to a pre-determined state.

12. The processor of claim 6, wherein the compare instruction is executed in a single clock cycle.

* * * * *